(12) United States Patent
Amer et al.

(10) Patent No.: US 12,591,241 B2
(45) Date of Patent: Mar. 31, 2026

(54) OBJECT ENROLLMENT IN A ROBOTIC CART COORDINATION SYSTEM

(71) Applicant: Robust AI, Inc., San Carlos, CA (US)

(72) Inventors: Mohamed R. Amer, San Francisco, CA (US); Sebastian Koch, Berlin (DE); Rodney Allen Brooks, San Francisco, CA (US); Anthony Sean Jules, Hillsborough, CA (US)

(73) Assignee: Robust AI, Inc., San Carlos, CA (US)

( * ) Notice: Subject to any disclaimer, the term of this patent is extended or adjusted under 35 U.S.C. 154(b) by 481 days.

(21) Appl. No.: 18/055,657

(22) Filed: Nov. 15, 2022

(65) Prior Publication Data

US 2024/0160212 A1     May 16, 2024

(51) Int. Cl.
| | |
|---|---|
| *G05D 1/00* | (2006.01) |
| *G06V 10/774* | (2022.01) |
| *G06V 20/58* | (2022.01) |

(52) U.S. Cl.
CPC ......... *G05D 1/0246* (2013.01); *G05D 1/0291* (2013.01); *G06V 10/774* (2022.01); *G06V 20/58* (2022.01)

(58) Field of Classification Search
CPC ..... B25J 9/1671; B25J 9/1664; G05D 1/0246; G05D 1/0221; G05D 2109/18; G05D 2109/10; G05D 1/69; G05D 1/225; G05D 1/6987; G05D 1/0287; G05D 1/0212; G06V 20/56; G06V 20/58; G06V 10/764; G06V 10/774; G06V 20/64; G06V 10/255; G06V 20/20; G06V 20/70; G06V 20/60; B60W 60/001; B60W 2420/403; B60W 2420/408; Y10S 901/01; G06T 19/003
See application file for complete search history.

(56) References Cited

U.S. PATENT DOCUMENTS

| | | | |
|---|---|---|---|
| 9,674,507 | B2 | 6/2017 | Pirchheim et al. |
| 10,553,026 | B2 | 2/2020 | Yan et al. |

(Continued)

FOREIGN PATENT DOCUMENTS

| | | | | |
|---|---|---|---|---|
| CN | 110405756 | A | 11/2019 | |
| CN | 114571460 | A * | 6/2022 | ............ B25J 9/1612 |

(Continued)

OTHER PUBLICATIONS

Office Action (Final Rejection) dated May 5, 2025 for U.S. Appl. No. 18/055,651 (pp. 1-33).

(Continued)

*Primary Examiner* — Hitesh Patel
*Assistant Examiner* — Elle Rose Knudson
(74) *Attorney, Agent, or Firm* — Polygon IP, LLP

(57) ABSTRACT

One or more simulated capture paths through a physical environment may be determined for a robot based on an environment navigation model of the physical environment. A plurality of simulated object parameter values may be determined for an object type. Simulated sensor data for a plurality of simulated instances of the object type may be determined based on the one or more simulated capture paths, the environment navigation model, and the simulated object parameter values. An object recognition model to recognize an object corresponding with the object type based on the simulated sensor data.

13 Claims, 17 Drawing Sheets

(56)     References Cited

U.S. PATENT DOCUMENTS

| | | | | |
|---|---|---|---|---|
| 11,256,958 | B1 * | 2/2022 | Subbiah | G06N 3/08 |
| 11,270,148 | B2 | 3/2022 | Li et al. | |
| 11,941,499 | B2 * | 3/2024 | Lin | G06T 7/20 |
| 2011/0288684 | A1 | 11/2011 | Farlow | |
| 2016/0089791 | A1 * | 3/2016 | Bradski | G06T 7/13 |
| | | | | 700/214 |
| 2017/0132334 | A1 * | 5/2017 | Levinson | B60W 50/00 |
| 2019/0213787 | A1 * | 7/2019 | Deng | G06T 15/40 |
| 2020/0011668 | A1 | 1/2020 | Derhy | |
| 2020/0239231 | A1 | 7/2020 | Johnson | |
| 2020/0293054 | A1 * | 9/2020 | George | G05D 1/0221 |
| 2021/0117696 | A1 * | 4/2021 | Hertlein | G06F 18/25 |
| 2022/0147049 | A1 * | 5/2022 | Meng | G01S 13/867 |
| 2022/0288783 | A1 * | 9/2022 | Sundermeyer | B25J 9/1669 |
| 2022/0291692 | A1 | 9/2022 | Drinkard | |
| 2024/0094737 | A1 * | 3/2024 | Mercer | G05D 1/622 |
| 2024/0160210 | A1 | 5/2024 | Amer | |
| 2024/0296662 | A1 * | 9/2024 | Solowjow | G06T 15/20 |

FOREIGN PATENT DOCUMENTS

| | | | | |
|---|---|---|---|---|
| KR | 20190094311 | A * | 8/2019 | B25J 13/003 |
| WO | WO-2020069379 | A1 * | 4/2020 | G06V 10/768 |

OTHER PUBLICATIONS

Office Action (Non-Final Rejection) dated Dec. 17, 2024 for U.S. Appl. No. 18/055,651 (pp. 1-36).

* cited by examiner

Environment Navigation Model
Refinement Method

─702

Extract trackable features from the sensor data

─704

Determine environment semantics

─706

Determine object semantics

─708

Filter features that track moving object

─710

Update the model based on the semantics and features

Done

Robotic cart 800

Processor 902

Sensor module 910

Memory module 904

Action apparatus 912

Communication interface 906

Mobility apparatus 914

Storage device 908

Human communicative apparatus 916

1006

1002

1004

1000

1008

1020

1010

1040

1012

1010

1040

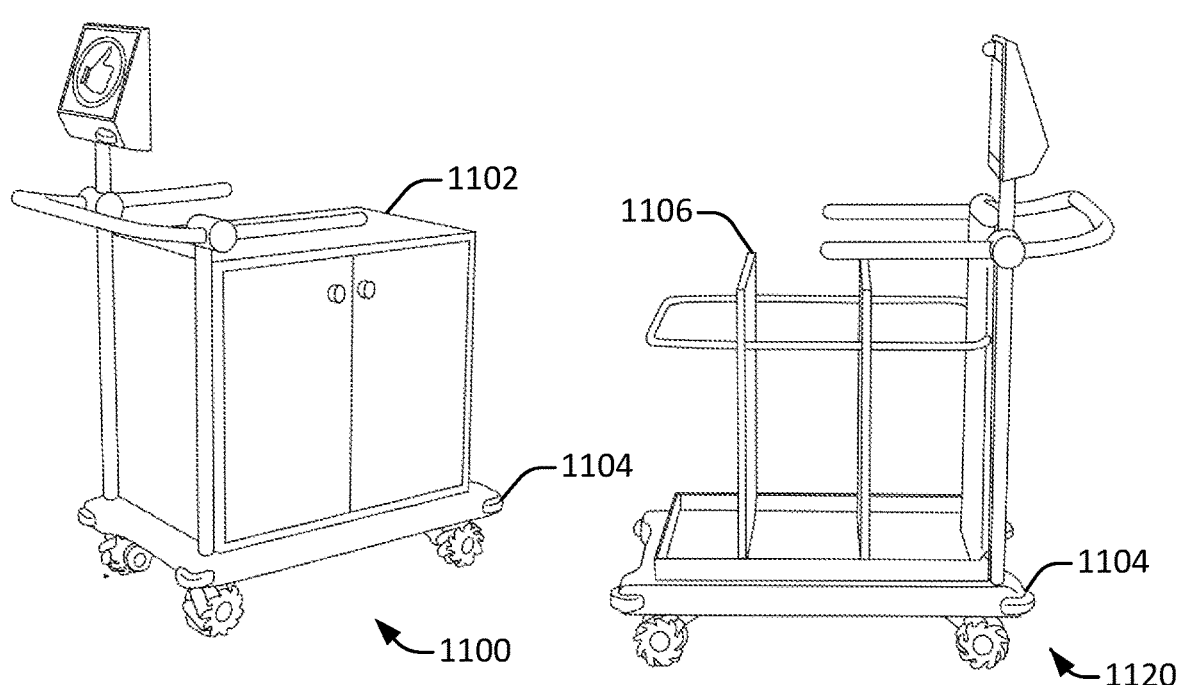
1102
1104
1106
1104
1100
1120
Figure 11A    Figure 11B
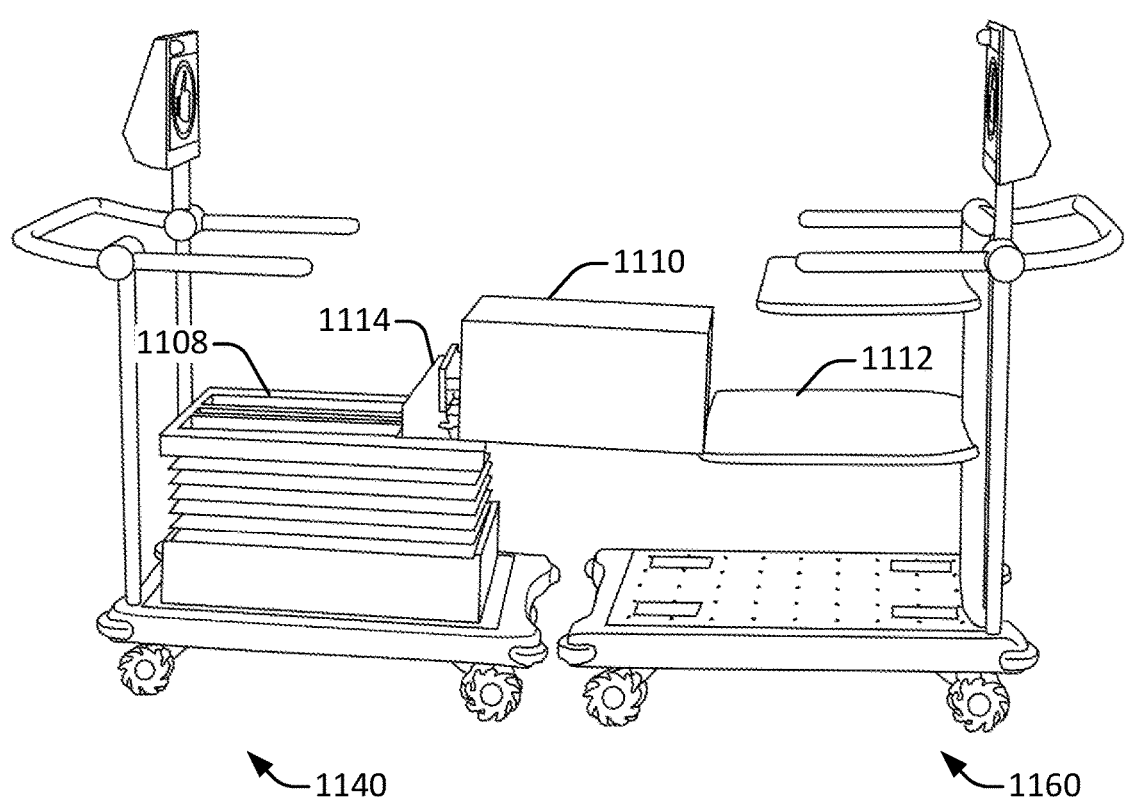
1110
1114
1108
1112
1140
1160
Figure 11C

System 1400

Processor
1401

Memory 1403

Storage
Device 1405

Bus 1415

Interface
1411

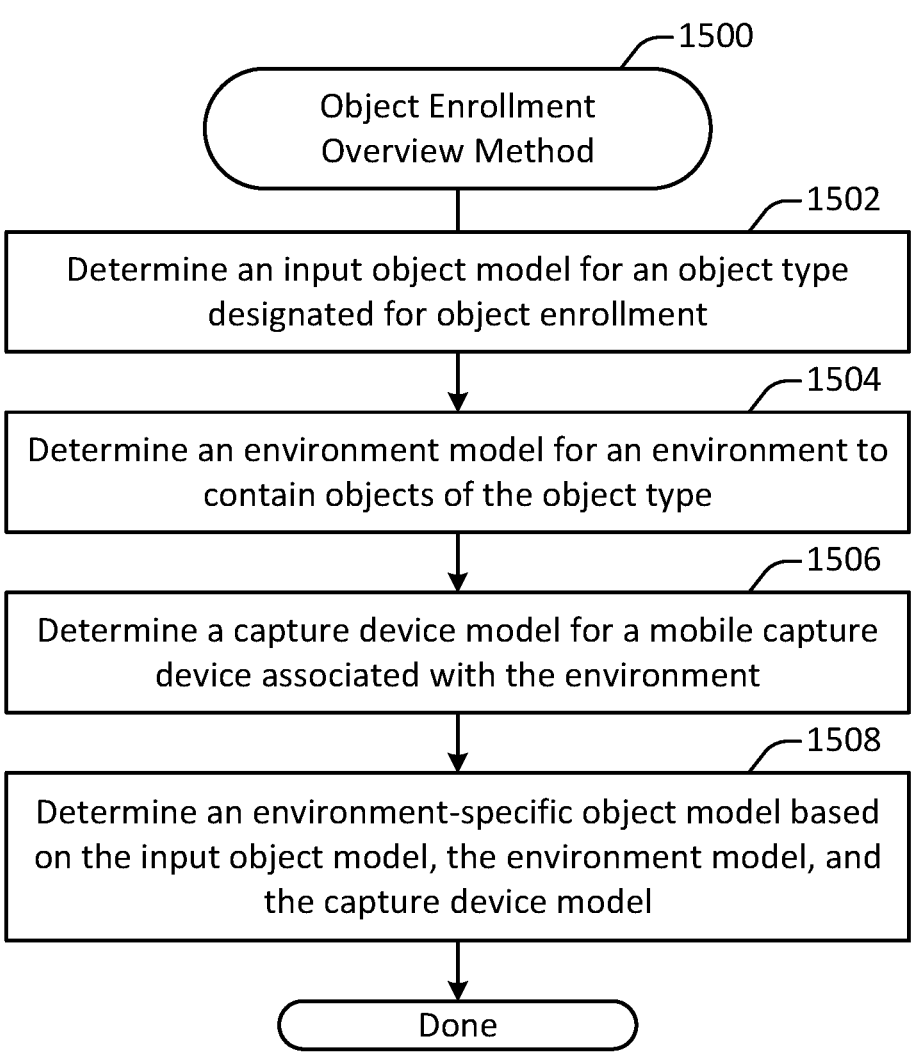

1500

Object Enrollment
Overview Method

1502

Determine an input object model for an object type
designated for object enrollment

1504

Determine an environment model for an environment to
contain objects of the object type

1506

Determine a capture device model for a mobile capture
device associated with the environment

1508

Determine an environment-specific object model based
on the input object model, the environment model, and
the capture device model Done

Figure 15

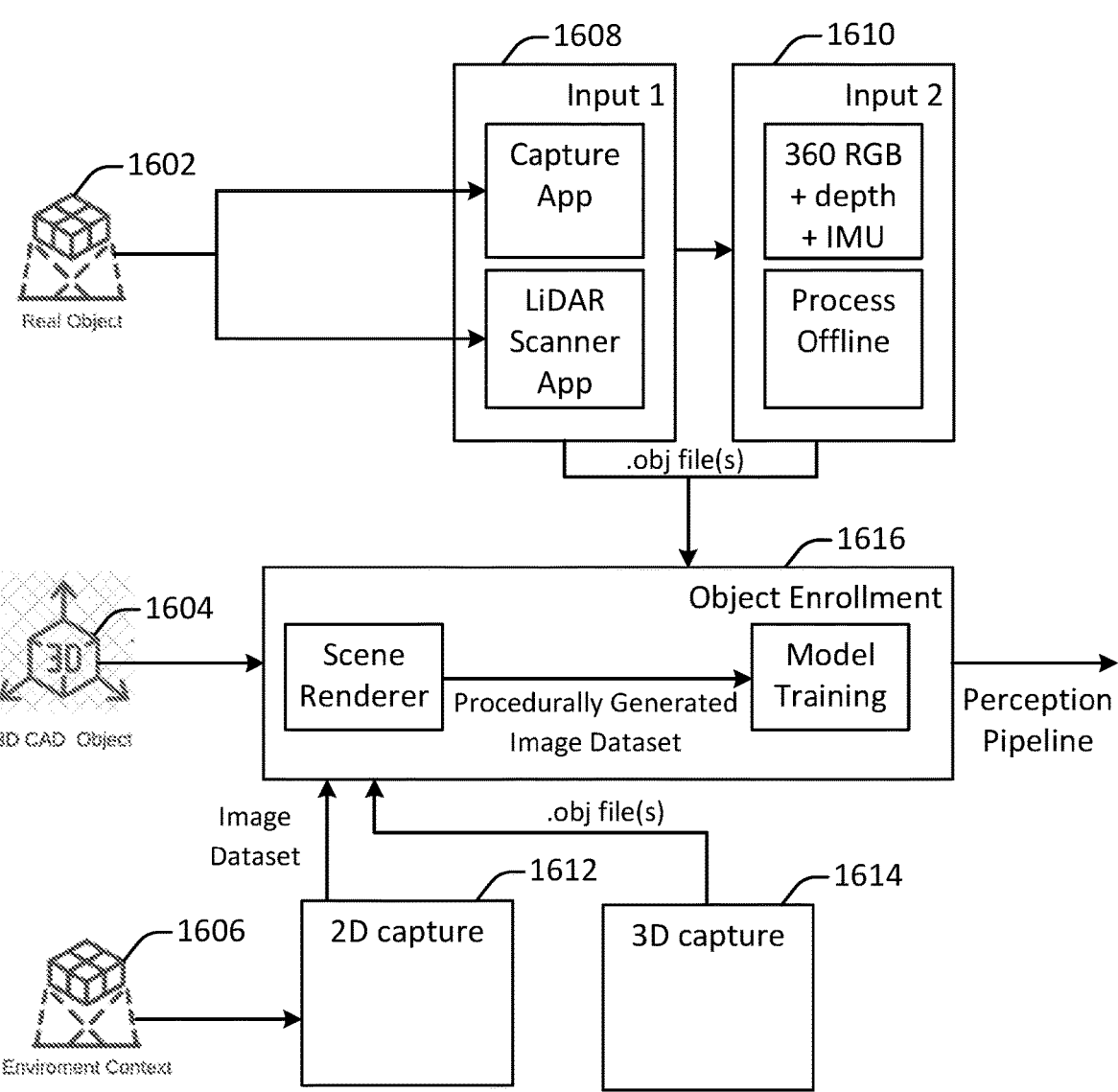
Figure 16      1600

OBJECT ENROLLMENT IN A ROBOTIC CART COORDINATION SYSTEM

FIELD OF TECHNOLOGY

This patent application relates generally to robotics, and more specifically to recognition of objects in a physical environment by a robot.

BACKGROUND

A robot may more accurately interact with objects in a physical environment if it possesses an accurate representation of those objects. However, generating a suitable representation of an object involves many technical challenges. For example, objects may appear differently in different orientations, locations, and lighting conditions. As another example, objects may be occasionally occluded by other objects or stacked and arranged in a variety of ways. Given the importance of robotic object interaction, improved techniques for determining accurate representations of physical objects are desired.

SUMMARY

Techniques and methods described herein provide for embodiments of systems, devices, methods, and non-transitory computer readable media having instructions stored thereon for determining an object recognition model for one or more types of objects within a physical environment. According to various embodiments, one or more simulated capture paths through a physical environment may be determined for a robot based on an environment navigation model of the physical environment. A plurality of simulated object parameter values may be determined for an object type. Simulated sensor data for a plurality of simulated instances of the object type may be determined based on the one or more simulated capture paths, the environment navigation model, and the simulated object parameter values. An object recognition model to recognize an object corresponding with the object type based on the simulated sensor data.

In some embodiments, the simulated object parameter values may include one or more object intrinsic characteristic parameters that characterize one or more physical characteristics of one or more of the plurality of simulated instances of the object type. The one or more object intrinsic characteristic parameters may include size, shape, texture, shading, stacking, and/or blur.

The simulated object parameter values may include one or more object placement characteristic parameters that characterize one or more physical characteristics of one or more of the plurality of simulated instances of the object type. The one or more object placement characteristic parameters may include object grouping, object rotation, and/or object stacking.

In some embodiments, the simulated object parameter values may include one or more object extrinsic characteristic parameters that characterize the physical environment. The one or more object extrinsic characteristic may include a parameter related to a lighting or shading condition of the physical environment The object recognition model may be sent to a designated robot. The designated robot may be instructed to autonomously navigate the physical environment and recognize objects based on the object recognition model and sensor data collected via the designated robot. The designated robot may be one of a plurality of robots instructed to autonomously navigate the physical environment and recognize objects based on the object recognition model.

In some embodiments, instructing the designated robot to autonomously navigate the physical environment may include transmitting a navigation instruction from a fleet management system configured to manage operation of a plurality of robots at the physical environment.

In some embodiments, the environment navigation model may be determined based at least in part on sensor data collected via a handheld mobile enrollment device. The mobile enrollment device may be a mobile phone.

In some embodiments, the environment navigation model for the physical environment may be determined based on simultaneous localization and mapping (SLAM). The environment navigation model may include a semantic label corresponding with a portion of the physical environment.

The simulated sensor data may include depth sensor data collected from a simulated depth sensor at a robot, image data collected from a simulated camera at a robot, and/or LiDAR data collected from a simulated LiDAR sensor at a robot.

BRIEF DESCRIPTION OF THE DRAWINGS

The included drawings are for illustrative purposes and serve only to provide examples of possible structures and operations for the disclosed inventive systems, apparatus, methods, and computer program products for place enrollment for a robot. These drawings in no way limit any changes in form and detail that may be made by one skilled in the art without departing from the spirit and scope of the disclosed implementations.

FIG. 11A, FIG. 11B, and FIG. 11C illustrate robotic carts, configured in accordance with one or more embodiments.

FIG. 15 illustrates a method for enrolling an object, performed in accordance with one or more embodiments.

FIG. 16 illustrates an architecture diagram for an object enrollment system, configured in accordance with one or more embodiments.

DETAILED DESCRIPTION

Figure 1:
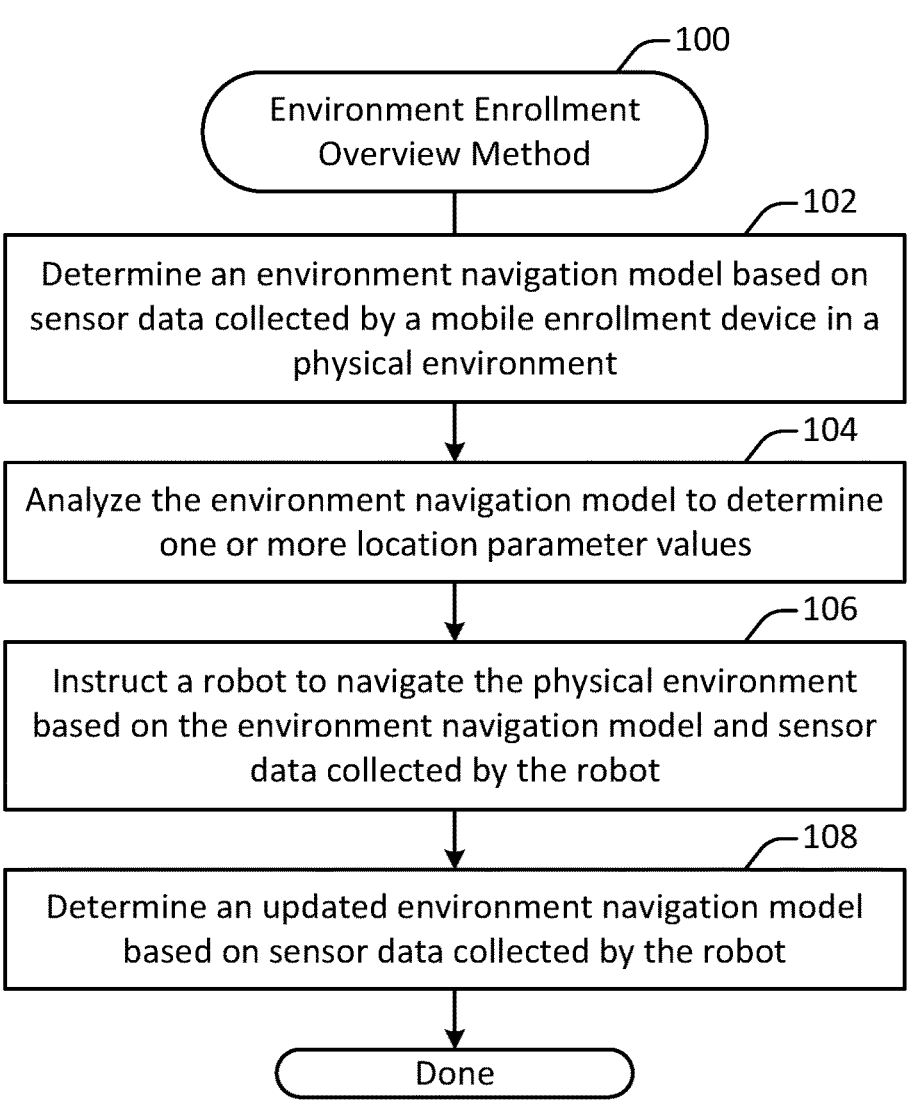
FIG. 1 illustrates an example of an environment enrollment overview method, performed in accordance with one or more embodiments.

Techniques and mechanisms described herein provide for the creation of an environment-specific object recognition model. Instances of a particular object type may be simulated in a variety of locations and contexts within a physical environment based on object characteristic parameter values. Simulated sensor data of the object instances may then be generated based on simulated paths of a robot through the environment, as well as simulated sensors at the robot. This simulated sensor data may be used to train the environment-specific object recognition model for recognizing instances of the object type within the physical environment.

Techniques and mechanisms described herein also provide for environment-specific object enrollment. Object enrollment refers to a process by which an object is analyzed for the purpose of automated recognition by a robot or other scanning device. Contextual data may be generated by using a rendering engine to generate contextualized data and annotations rather than collecting and annotating them manually. The contextual data generator can employ the 3D scanned environment, simulate the location of the camera, and/or vary the sensor simulation to support the enrollment of objects for robotics applications.

Conventional deep learning models for object detection and activity recognition require large amounts of data to create a generalized detector that can work in virtually any situation. Enrolling a novel object to be detected using conventional techniques requires a non-trivial effort of scenario planning, data collection, and annotation that usually takes in the order of months before a useful detector of a novel object is trained. Conventional simulation approaches use synthetic environments which don't match the reality where objects and activities exist. Sim-to-Real efforts using additional deep learning algorithms such as domain randomization and domain adaptation tend to be computationally intensive, potentially introducing unnatural noise and artifacts to the data, and are poorly informed with the reality where objects and activities occur.

In contrast to conventional techniques, embodiments described herein provide for object enrollment based on an environment navigation model that includes a scanned 3D environment where the object is to be detected. The machine learning detectors may then be overfitted to detect the objects within the 3D scanned environment. The parameters of the object may be procedurally varied to cover variations expected to happen in the specific 3D environment. Further, data may be procedurally generated from the point of view of the robot or the witness camera. In this way, objects such as inventory within a warehouse may be detected, managed, and tracked without scanning, and robots may detect the objects in context in the specific environment. That is, techniques and mechanisms described herein may be applied to improve applications such as inventory tracking, localization, object counting, object management, and/or labor management.

According to various embodiments, the system may employ as an input a 3D CAD model, a captured 3D Scanned model, or the like, which may be processed using an application such as Photogrammetry and/or 3D reconstruction. In addition, the system may employ as an input a 3D scan of the environment, along with actual 3D projected images, where the object is to be detected, allowing the trained detector to overfit to the environment texture and matching light. Also, the system may employ as an input a 3D model of the capture device that identifies the sensor (e.g., camera) locations.

Techniques and mechanisms described herein also provide for the creation and updating of an environment navigation model. An environment navigation model includes a variety of data elements that may be used by a robot to autonomously or semi-autonomously navigate a physical environment such as a warehouse, dwelling place, or other physical area. An initial environment navigation model may be determined based on sensor data collected from a mobile enrollment device such as a mobile phone equipped with one or more sensors. The environment navigation model may be analyzed to determine one or more parameters associated with a physical environment, such as an estimated number of robots needed to perform a designated function at the physical environment. Then, a robot may navigate the physical environment based on the initial environment navigation model and sensor data collected by the robot. The sensor data may be used to refine the environment navigation model, which may be used to guide future navigation of the physical environment by the robot.

Conventional approaches for robot onboarding involve multiple challenges. For a robot to navigate in a new environment using conventional approaches, it typically needs to build a map using its own sensors, usually a single 2D LiDAR. This technology is called Simultaneous Localization and Mapping (SLAM) for robot navigation. Mapping for navigation is usually done by driving, or tele-operating, the robot in one continuous capture session. Dynamic obstacles typically need to be removed to avoid creating permanent artifacts that remain in the map. The capture session is processed through an algorithm, for example Cartographer, and results in a 2D navigation map. The map is then used for navigation by all robots carrying the same kind of sensor mounted at the same position.

Conventional approaches for onboarding a new robot require the presence of a robot, a robot operator familiar with tele-operation and map processing, and a static environment with no dynamic obstacles, such as humans or forklifts, or other vehicles. In case of large environmental change, a remapping of the environment is needed. 2D LiDAR sensors capture a very narrow view of the world, and only depth information. Even in the case of using the more expensive 3D LiDAR sensors, the presence of only depth data constrains the possible approaches to mapping. Other robots typically need the same sensor to achieve the best outcomes.

Using conventional approaches, updating a map generated by a robot is quite challenging especially in the case of using sensors such as LiDARs. The default, in case of a failed initial capture session, or in the case of changes to the environment, is to remap the whole environment from scratch in a single continuous capture session.

Conventional approaches that rely on depth-only SLAM extracted features are not easily transferable, even across different depth sensors. Accordingly, the process of mapping is not distributed. The map needs to be captured using the same device during the same session without interruptions.

In contrast to conventional techniques, techniques and mechanisms described herein allow a user to map a physical environment to create a 3D mesh using a mobile phone or other suitable computing device. For example, a tool such as VoxBlox or Kimera may be used to create a 3D mesh. A user and/or the system may specify a set of objects of interest located in the environment. The system may annotate areas and objects. The user may create a 3D bounding box around any missed objects, fix any mis-annotated areas or objects, and/or specify any additional knowledge in the world representation. The resulting model may then be used by robots to provide knowledge of places and objects, including constraints, to navigate the physical environment. The model may be updated during the navigation. The robot and/or enrollment device may be localized using the scanned mesh and/or a generated 2D map.

Techniques and mechanisms described herein provide for a new approach for robot enrollment in a new environment, mapping, and remapping. According to various embodiments, the mapping may be initialized by any capture devices that use cameras, including RGB and RGB-D cameras on consumer phones and tablets. LiDAR sensor streams may be included as an additional, optional, source of information. Once an environment is scanned, the extracted visual features and point clouds may be stored in a database, on device or on cloud, and used to create a 3D mesh of the environment, along with a 2D navigation map. For a robot to navigate, or for a person to localize themselves within the environment, the database and map may be loaded on a device to provide the ability to match the extracted features observed against those stored and localize themselves. In case of changes to the environment, the user can go back and update or change areas as needed without having to scan the full environment again and share the updates with any of the devices.

According to various embodiments, this approach does not require the presence of the robot in the environment. That is, a user can start preparing the map ahead of the arrival of the physical robot. Further, there is no need for the mapping to be done all at once, or by one device using one capture session. Rather, mapping can be done with multiple devices with different sessions, as long as there is an overlap in their capture. The user can update the map in areas that change by simply scanning the modified area using a localized device without having to remap the whole environment.

In some embodiments, since the system relies primarily on cameras, it has the ability to extract scale and transformation invariant features. Such features can be extracted using different cameras, resulting in the exact same extracted features. This approach enables matching mapping and localization using the extracted features for Visual Simultaneous Localization and Mapping (vSLAM) algorithms across different devices while achieving substantially similar results. By removing sensor dependency, the user can employ a device such as a mobile phone to enroll a new environment and update environments along the way without having the burden of tele-operating a robot and capturing a perfect session to enable mapping.

According to various embodiments, multiple devices, whether they are phones only, robot sensors only or robots and phones, may be used to map an environment simultaneously. In this way, the mapping may be done using multiple captures sessions from heterogeneous devices and resulting in a map usable by all the different devices.

According to various embodiments, by hosting a global database in the cloud, the system can push updates from each of the local mapping devices databases, and generate an up-to-date global map that may then be shared and synchronized with all the devices as needed.

In some embodiments, object detection and semantic segmentation may be used to identify environment constants. For example, in a warehouse environment, floors, shelves, doors, windows, fire extinguishers, conveyor belts may be constant in the environment. However, the items on the shelves, people, and pallets are dynamic and can move in the environment. By identifying the static vs dynamic environment entities, the system can filter the extracted features to use static rather than dynamic features for localization, to avoid confusing the vSLAM algorithm.

According to various embodiments, the point of view of a robot may differ from that of a human. As long as extracted features overlap between the two points of view, the robot can localize itself successfully and add new extracted features from its own point of view to complement those collected by the humans.

Techniques and mechanisms described herein are directed to a robotic cart capable of transporting items. The robotic cart may be capable of making decisions and taking actions based on social accommodation and prediction of human and non-human activity. The robotic cart may be equipped with a movement capability and may execute a task such as object manipulation within a physical environment. At the same time, the robotic cart may actively scan the environment to perform environmental mapping and to distinguish animate things (e.g., people, other robots, animals, forklifts, etc.) from inanimate things (e.g., tables, shelves, walls). The robotic cart may then predict the actions of animate things and respond accordingly.

In some implementations, a robotic cart may be configured to determine a course of action that is consistent with one or more governing principles. For example, a first principle may specify that a robotic cart will never collide with a person or perform an action such as falling over a cliff or down stairs that may cause the robotic cart to unintentionally collide with a person. As another example, a second principle may specify that a robotic cart must obey the commands of a human except where the robotic cart would violate the first principle. As yet another example, a third principle may specify that a robotic cart obeys fleet management instructions except insofar as it detects conditions such as low power or malfunction and takes steps to correct (e.g., moving to a recharging location) or otherwise respond to (moving to a safe location and activating an alert function) such conditions.

According to various embodiments, a robotic cart may be designed in a modular fashion in which the same basic design may be adapted to various configurations. For example, a robotic cart may include one or more cabinets, shelves, temperature-controlled containers, and/or other storage elements. As another example, a robotic cart may include one or more scissor lifts, conveyor belts, and/or other devices. As yet another example, a robotic cart may be configured to transport a human.

In particular embodiments, a robotic cart may be configured to transport a human in a variety of positions. For example, a robotic cart may be configured to transport a human in a hospital setting bed capable of accommodating a human in a supine, semi-sitting, or sitting position. In such a setting, a robotic cart may function as a bed that can perform operations such as being directed by an orderly in a force-assisted manner, being summoned to where it is needed, returning autonomously to a designated location when a patient is not on the bed, and/or avoiding collisions when operating in either a force-assisted or autonomous mode. As another example, a cart may be configured to transport a human standing on the cart.

In particular embodiments, a robotic cart may be configured to perform transport operations in a variety of settings. Such configurations may include, but are not limited to: a hotel luggage carrier, a cleaning supplies carrier, a restaurant food server, a restaurant dirty dish collector, a hotel room service provider, a towel or food carrier for poolside service, a pharmacy delivery robot within a hospital, a hospital room service provider, a hospital lab sample deliverer, an airport luggage storage and/or retrieval unit, a passenger luggage transporter, a mail and package delivery unit within a commercial or residential setting, a book transport unit within a library, a staging unit for trades such as construction or plumbing work, pallet delivery.

In particular embodiments, a robotic cart may be configured as a powered shopping cart. In such a configuration, a cart may associate itself with a particular human or humans, for instance when a human waves to the cart when entering a store. The robotic cart may then follow the human, allowing the human to use both hands to pick items. Items in the robotic cart may be detected by a scanner, which may update a running tally of items and price. The robotic cart may be configured to function in a socially adaptable way, for instance by getting out of the way of other shoppers and then catching up to the associated human when possible. The human may grab the cart by a handle bar to enter a manually operated mode, for instance to direct the cart into an elevator. The cart may be equipped to respond to verbal queries about the location of items, and/or lead a human to the location of an item within a store. The cart may be configured to follow a human to a location such as a vehicle, and then autonomously return to a designated location when the cart has been emptied.

According to various embodiments, a robotic cart may be designed in a modular fashion in which the same basic design may be adapted to various functionalities. For example, a robotic cart may be configured to perform door opening and/or closing. As another example, a robotic cart may be configured to pick up, transport, and/or relocate items. As another example, a robotic cart may be configured to load and/or unload items. As another example, a robotic cart may be configured to operate elevators, doors, and/or other devices. As another example, a robotic cart may be configured to scan barcodes, read RFID tags, and/or perform various inventory tracking tasks.

According to various embodiments, a robotic cart may be configured to be responsive to human interaction when the robotic cart occupies the same shared physical space as a human. For example, a robotic cart may be configured to avoid occupying a certain radius of physical space around a human. As another example, a robotic cart may be configured to avoid moving along a path predicted to intersect a human's predicted path.

In some embodiments, a robotic cart may be configured to respond to motion initiated by a human. For example, a robotic cart may approach a human who summons the robotic cart by waving in the robotic cart's direction. As another example, a robotic cart may be configured to follow a human along a path determined by the human to assist them with a task. For instance, a robotic cart may follow a human to assist the human by picking up or transporting items. As yet another example, a the robotic cart may be configured to lead the human to a destination. For instance, a robotic cart may help a new hire find the cleaning supplies closet or may lead a customer to the nearest customer service representative.

In some implementations, a robotic cart may determine whether to wait to resume a task or move onto another task based on, for instance, predicted human activity. For example, the robotic cart may predict that a human is likely to enter and quickly leave an area based on the human's movement along a path. In such a situation, the robotic cart may elect to wait for the human to pass and then resume the task. As another example, the robotic cart may predict that a social disruption is likely to be long-lasting, such as when a human is rearranging items in an area of a warehouse. In such a situation, the robotic cart may elect to move on to a different task. As another example, a robotic cart may determine that it should return a charging dock or rejoin a collection of other robotic carts when not in use for a designated period of time.

According to various embodiments, the robotic cart may strategically determine whether to employ active or passive waiting based on factors such as whether the area is crowded with people, the time required to switch between tasks, the time scheduled in which to complete one or more tasks, and/or instructions from humans. Similarly, the robotic cart may strategically communicate with humans based on factors such as whether the area is crowded with people, whether the robotic cart is in autonomous vs assistive mode, and whether the robotic cart is in need of assistance or direction. For instance, the motions of the robotic cart and/or the display on the robotic cart may change based on the proximity of humans.

According to various embodiments, as part of responding to the presence of a human or at any other time, a robotic cart may provide any of a variety of social cues. Examples of such cues may include, but are not limited to: lights, sounds, vibration, and movement. For example, a robotic cart may activate one or more lights and/or emit one or more sounds when a task is initiated. As another example, a robotic cart may make a verbal acknowledgment such as "ready to assist." As another example, a robotic cart may visually display words such as "ready to use", a symbol such as a "thumbs up", or an indicator such as a green light. As another example, a robotic cart may display or communicate visually or verbally that it is "unable to assist" or display a red light. As another example, a robotic cart may display or communicate verbally that it "requires assistance" when it senses a human approaching, for instance by flashing red lights, displaying a message, emitting a sound, or verbally requesting assistance.

In some embodiments, a robotic cart may communicate interactively with a human by providing any of a variety of social cues. Examples of such cues may include, but are not limited to: lights, sounds, vibration, and movement. For example, a robotic cart may respond to any nonverbal and/or verbal commands initiated by a human by acknowledging the command. As another example, in acknowledging a nonverbal or verbal commands given by a human, the robotic cart may initiate the task. As another example, the robotic cart may display a visual indicator in response to the verbal or nonverbal command. As another example, the robotic cart may communicate to confirm the nonverbal or verbal commands before proceeding with the task. For instance, the robotic cart may verbally repeat a verbal or nonverbal command, or provide a nonverbal visual cue such as a light or display to confirm a verbal or nonverbal command. As another example, a robotic cart may respond to a query initiated by a human. For instance, in response to a query about where an item is located, the robotic cart may respond by displaying the information or by physically guiding the human to the location of the item.

According to various embodiments, a robotic cart may be configured to operate cooperatively with one or more robotic carts. For example, one robotic cart may be configured to identify, select, and pick up an item, while another robotic cart may be configured to coordinate with the first robotic cart to receive the selected item and transport it to a different location, and yet another robotic cart is configured to receive another selected item to transport it to another different location. As another example, a robotic cart may be configured to request assistance from another robotic cart. For instance, a first robotic cart may communicate a request to another robotic cart to remove an obstruction from the first robotic cart's intended path.

According to various embodiments, a robotic cart may be configured to operate cooperatively with one or more robotic carts and one or more humans. For example, one robotic cart may receive verbal and/or nonverbal instructions from a human, while another robotic cart may be configured to coordinate autonomously with the first robotic cart and with other robotic carts to complete a task. For instance, a human operator might override the autonomous operation of the first robotic cart by, for example, grasping the handles of the robotic cart and using it as a manual cart. The first robotic cart may communicate to other robotic carts to carry on and complete a series of autonomous tasks.

According to various embodiments, a robotic cart may be configured to communicate information about its path and environment. For example, as a robotic cart enters unfamiliar or changed terrain, it may update and share a map of the terrain. For instance, the robotic cart may share an updated map indicating the presence of obstructions, a map of pathways, or the presence of humans in the space. The robotic cart may share this information with other robotic carts, other humans, a central management system, or other such information recipients.

According to various embodiments, a robotic cart may be configured to capture and share information about items in its environment. For example, a robotic cart may be configured to scan items and record them in an inventory. As another example, a robotic cart may be configured to scan a space and report the number of humans in the space. As yet another example, a robotic cart may be capable of determining that a space is not occupied by humans, and determine that it and other robotic carts may move freely and more quickly in an unoccupied space.

According to various embodiments, a robotic cart may be configured to perform operations to maintain its functionality. For example, a robotic cart may be configured to determine its own level of power supply, and return to a charging station when it is out of power. As another example, a robotic cart may be configured to run diagnostic tests on its system to ensure operability. For instance, a robotic cart may run tests on, update, and/or recalibrate any of the following to ensure operability: sensors, algorithms, and operating system. As another example, a robotic cart may be configured to re-calibrate algorithms continuously during operation. For instance, a robotic cart may re-calibrate an algorithm continuously based on changes to its environment, such as the number of humans in shared physical space, the number of other robotic carts that it may coordinate with, the average temperature of the environment, the lighting conditions of the environment, or the number of items in an environment.

According to various embodiments, a robotic cart may be configured to diagnose issues and resolve them. For example, a robotic cart may be configured to recognize when it is stuck and unable to move forward, and communicate a request for assistance. As another example, a robotic cart may be configured to run diagnostic tests on its system, and recover from system errors autonomously. As another example, a robotic cart may be configured to recover from errors by requesting assistance from other robotic carts. For instance, a robotic cart may request assistance in removing obstructions from its intended pathway.

According to various embodiments, a robotic cart may be configured to sense the approach and directionality of humans in a shared physical space. For example, a robotic cart may be configured with a one or more sensors capable of sensing humans and/or other aspects of its environment. As another example, a robotic cart may be configured to scan a person as they approach the robotic cart, and may be capable of using facial recognition to identify one or more persons. For instance, the robotic cart may recognize a person and address the person by name, and/or determine a set of commands the person is authorized to perform.

According to various embodiments, a robotic cart may be configured to be responsive to human physical interaction. For example, the hand railings on the robotic cart may be capable of sensing pressure, force, and/or torque, and respond accordingly to human physical direction. For instance, a robotic cart may be capable of pausing its autonomous operations when a human grasps a handrail, and convert from autonomous to manual mode. As another example, releasing the handrails of the robotic cart may communicate to the robotic cart that it is free to run autonomously and rejoin other robotic carts or return to a charging station.

In some implementations, the robot may be guided in its activity based on communication with a remote computing device such as a control computer having access to a database system. Alternatively, or additionally, the robot may report its actions to such a system.

In some implementations, the robot may coordinate with other robots. The other robots may be configured to perform complementary activities or may be focused on other tasks. Each robot may be directed by a central command and control apparatus. Alternatively, or additionally, the robots may communicate with each other directly.

In some implementations, the robot may communicate with nearby people. For example, the robot may receive instructions from a nearby person. As another example, the robot may receive instructions about social accommodation from a nearby person. The robot may be configured to verify the authority of the person to issue such instructions. For instance, the robot may be configured to ascertain the person's identity and/or role through any of various authentication mechanisms.

In some implementations, a robot may be equipped with semantic perception. Semantic perception may allow a robot to not only sense the presence of surfaces and objects in an environment, but also to identify the characteristics of those surfaces and objects. For example, people may be identified as such, and actions may be taken based on their anticipated behavior.

In some implementations, a robot may be equipped with multimodal perception. Multimodal perception may allow the robot to combine multiple approaches at the same time, for instance by performing one or more of sensing, movement, reporting, and/or social accommodation activities simultaneously or in close temporal proximity. Alternatively, or additionally, multimodal perception may allow the robot to combine input from different sensors such as one or more internal or remotely accessible microphones, cameras, gyroscopes, or other detecting devices. Accordingly, a robot may be equipped to conduct the flexible handling of objects, to develop and execute socially appropriate plans for interacting with an environment, and to adapt to new environments.

In some implementations, social accommodation allows a robot to treat humans differently than objects, allowing more natural and socially appropriate behavior. Velocity and trajectory information for humans can be used, allowing a robot to plan for where they are likely to be, and not merely where they are now. In addition, a robot can signal to humans in various ways to help alert humans to the current and future behavior of the robot.

In some implementations, a robot may be equipped to identify, create, and use two-dimensional (2D) and/or three-dimensional (3D) maps. For example, a robot may map annotations of regions such as aisles and departments in a store. As another example, the robot may perform continuous maintenance of maps over time. As yet another example, the robot may identify corridors and preferred routes for navigation, for instance based on past experience. Dynamic objects may be handled separately from fixed objects, and humans may be tracked based on fusing information from multiple sensors.

In particular embodiments, a robot can also perform tasks in a socially aware way, for instance by recognizing individuals based on role and/or identity, and then treating individuals differently based on those roles and/or identities. For example, a robot may be configured to respond to instructions from maintenance workers and administrators. However, the robot may be less accommodating of other individuals, such as members of the general public.

FIG. 1 illustrates an example of an environment enrollment overview method 100, performed in accordance with one or more embodiments. The method 100 may be performed on a computing system including or in communication with components such as a robot, a mobile enrollment device, and a navigation modeling system.

An environment navigation model of a physical environment is determined at 102 based on sensor data collected by a mobile enrollment device. According to various embodiments, the mobile enrollment device may be any suitable device equipped with one or more sensors such as cameras for capturing information about a physical environment. For instance, the mobile enrollment device may be a mobile phone, a dedicated scanning device, or a tablet computer. Additional details about mobile enrollment devices are discussed with respect to FIG. 3. Additional details related to determining an initial environment navigation model are discussed with respect to the method 400 shown in FIG. 4.

The environment navigation model is analyzed at 104 to determine one or more environment parameter values. According to various embodiments, the environment parameter values may include information such as an estimated number of robots needed for a particular physical environment. Additional details regarding the analysis of an environment enrollment model are discussed with respect to the method 500 shown in FIG. 5.

A robot is instructed to navigate the physical environment at 106 based on the environment navigation model and sensor data collected by the robot. An updated environment navigation model is determined at 108 based on sensor data collected by the robot. In this way, the environment navigation model may be intermittently or continuously refined to improve navigation by the robot. Although some examples are discussed herein with respect to a single robot, as discussed with respect to the architecture diagram 200 shown in FIG. 2, different configurations may include various numbers of robots. Additional details regarding the updating of an environment navigation model are discussed with respect to the method 600 shown in FIG. 6.

Figure 2:
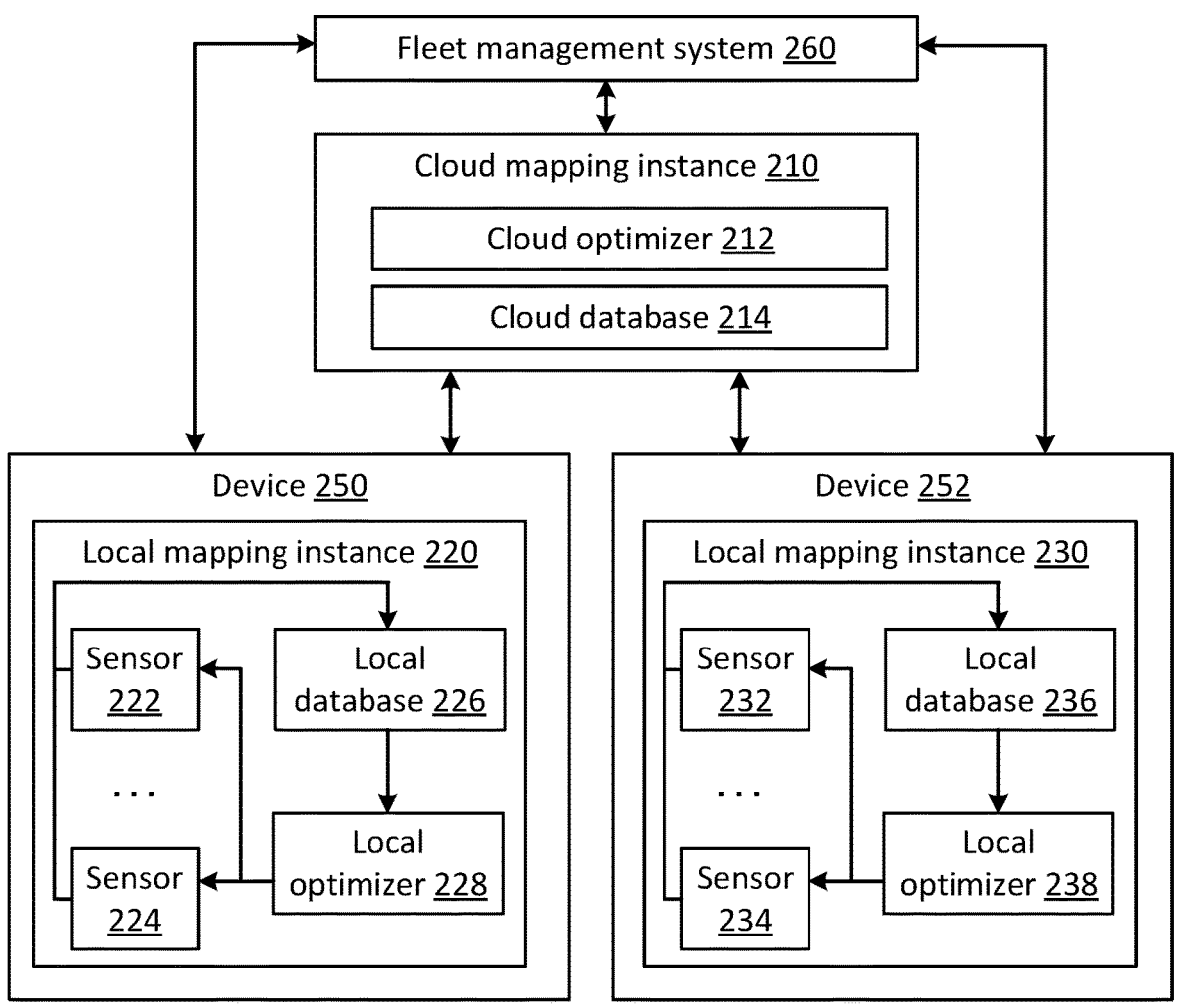
FIG. 2 illustrates an architecture diagram of a robot management system, configured in accordance with one or more embodiments.

FIG. 2 illustrates an architecture diagram of a robot management system 200, configured in accordance with one or more embodiments. The robot management system 200 includes a cloud mapping instance 210 in communication with devices 250 and 252 and with fleet management system 260.

According to various embodiments, the device 250 includes a local mapping instance 220, which in turn includes interfaces for the sensors 222 through 224, a local database 226, and a local optimizer 228. The device 252 includes a local mapping instance 230, which in turn includes interfaces for the sensors 232 through 234, a local database 236, and a local optimizer 238.

According to various embodiments, the devices shown in the system 200 may include robots, mobile enrollment devices, or both. For example, the device 250 may be a robot, while the device 252 may be a mobile enrollment device. Although two devices are shown in FIG. 2, the system may include any suitable number of devices.

In some implementations, the local mapping instance 220 may be implemented on a processor and in memory at the device 250. As discussed herein, a robot or a mobile enrollment device may include various types and numbers of sensors. The sensors may provide data for storage in a local database 226. The sensor data may then be processed by a local optimizer 228. The local optimizer 228 may determine or update a local environment navigation model. The local environment navigation model may be used to provide localization information for analyzing sensor data.

According to various embodiments, the cloud mapping instance 210 may include a cloud database 214 and a cloud optimizer 212. Information may be transmitted from the devices to the cloud mapping instance 210 and stored in the database 214. The information may be transmitted periodically, at scheduled times, or upon request. The stored information may be used by the cloud optimizer to determine or update a cloud environment navigation model.

According to various embodiments, the cloud navigation model may be used in any of various ways. For example, the cloud navigation model may be used to update or initialize a local navigation model on a device. As another example, the cloud navigation model may be used by a fleet management system 260 to guide the system in providing instructions to robots operating within the physical environment.

Figure 3:
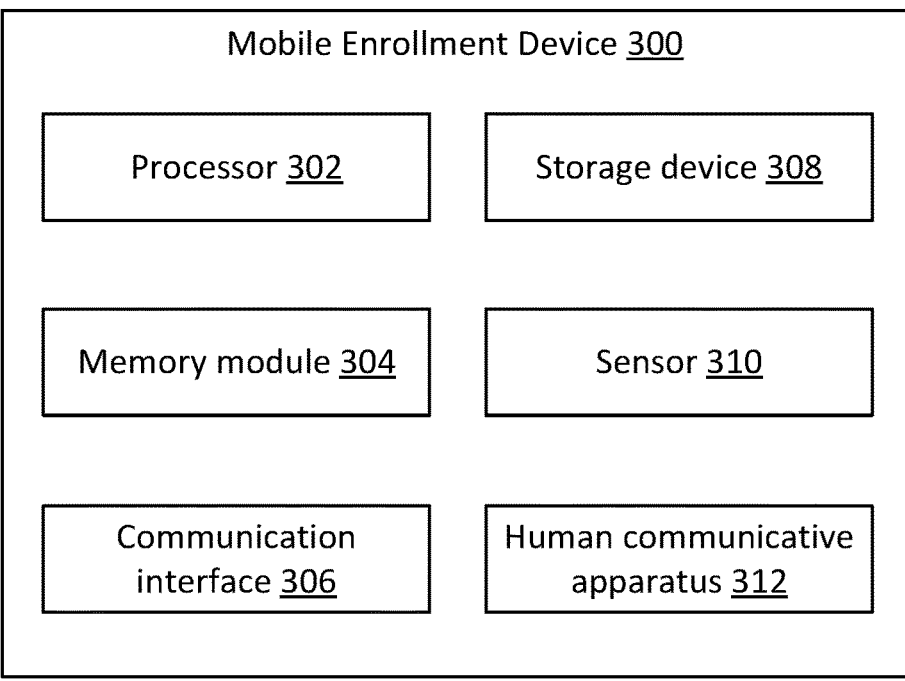
FIG. 3 illustrates an example of a mobile enrollment device, configured in accordance with one or more embodiments.

FIG. 3 illustrates an example of a mobile enrollment device 300, configured in accordance with one or more embodiments. The mobile enrollment device 300 may be or include any computing device capable of performing the needed functions. For example, the mobile enrollment device 300 may be a mobile phone, a laptop computer, a tablet computer, a dedicated scanning device, or any other suitable computing device.

The mobile enrollment device 300 includes a processor 302, a storage device 308, a memory module 304, a sensor 310, a communication interface 306, and a human communicative apparatus 312. According to various embodiments, the processor 302, memory module 304, and storage device 308 may be any suitable processor, memory module, or storage device capable of storing and processing data received by the sensor 310.

In some implementations, the communication interface 306 may include a wireless or wired device for transferring data from the mobile enrollment device 300 to a remote computing device such as a server. For instance, the communication interface 306 may be a WiFi interface or a USB interface.

According to various embodiments, the mobile enrollment device 300 may include one or more sensors, of one or more types. Examples of types of sensors may include, but are not limited to: monocular visible light cameras, stereo visible light cameras, time-of-flight sensors, structured light cameras, depth sensors, LIDAR scanners, GPS interfaces, and accelerometers. For instance, many mobile computing devices are equipped with front and back cameras of various types, as well as other sensors such as accelerometers.

The human communicative apparatus 312 may include one or more components for communicating with a human. For example, the human communicative apparatus 312 may include one or more display screens, which may or may not be equipped to support touch screen user input. As another example, the human communicative apparatus 312 may include one or more buttons or other affordances for controlling the mobile enrollment device 300.

Figure 4:
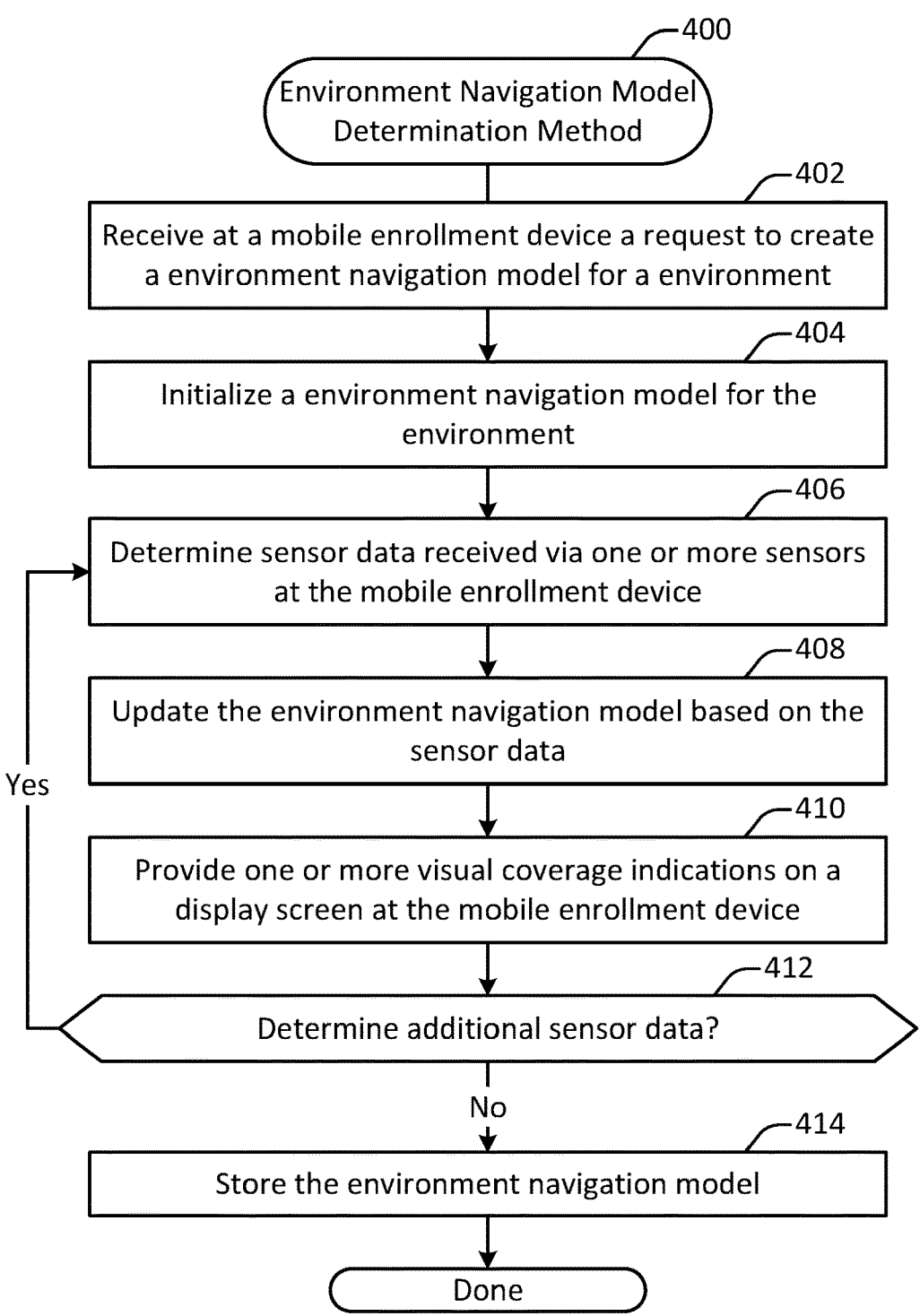
FIG. 4 illustrates an example of an environment navigation model determination method, performed in accordance with one or more embodiments.

FIG. 4 illustrates an example of an environment navigation model determination method 400, performed in accordance with one or more embodiments. The method 400 may be performed at one or more computing devices described herein, such as one or more devices shown in FIG. 2 or FIG. 3.

At 402, a request to create an environment navigation model for a physical environment is received at a mobile enrollment device. An environment navigation model for the physical environment is initialized at 404. According to various embodiments, initializing the environment navigation model may involve determining one or more parameters associated with the physical environment, such as one or more tasks regularly performed at the physical environment.

According to various embodiments, the term "physical environment" is used herein to refer to a defined region of physical space. For example, the term "physical environment" may refer to the interior region of a specific building or the interior region of a specific type or configuration of building (e.g., a standardized warehouse format). As another example, the term "physical environment" may refer to a floor or area of a specific building or type of building. As yet another example, the term "physical environment" may encompass interior and/or exterior areas of physical space.

Sensor data is received at 406 via one or more sensors at the mobile enrollment device. According to various embodiments, the sensor data may include visual data collected from one or more cameras, depth scan information, accelerometer information, or any other data collected from the sensors at the mobile enrollment device.

The environment navigation model is updated at 408 based on the sensor data. In some implementations, updating the environment navigation model may involve implementing a Visual simultaneous localization and mapping (SLAM) process in which the position and orientation of one or more sensors at the mobile enrollment device are determined with respect to the environment, while simultaneously mapping the environment around the sensor. Additional details regarding the refinement of an environment navigation model are discussed with respect to the method 700 shown in FIG. 7.

At 410, one or more visual coverage indications is provided on a display screen at the mobile enrollment device. In some implementations, the visual coverage indications may indicate to an operator of the mobile enrollment device a degree to which one or more areas of the environment are covered by sensor data. For instance, the visual coverage indication may be a heatmap overlain on a camera view of an area of an environment.

A determination is made at 412 as to whether to determine additional sensor data. In some embodiments, the determination may be made based on any number of considerations. For example, additional sensor data may continue to be collected while an enrollment application is running. As another example, additional sensor data may continue to be collected while coverage levels for the environment as a whole or areas of the environment are insufficiently high.

The environment navigation model is stored at 414. In some embodiments, storing the environment navigation model may involve transmitting the model to a remote computing device, such as a cloud database.

Figure 5:
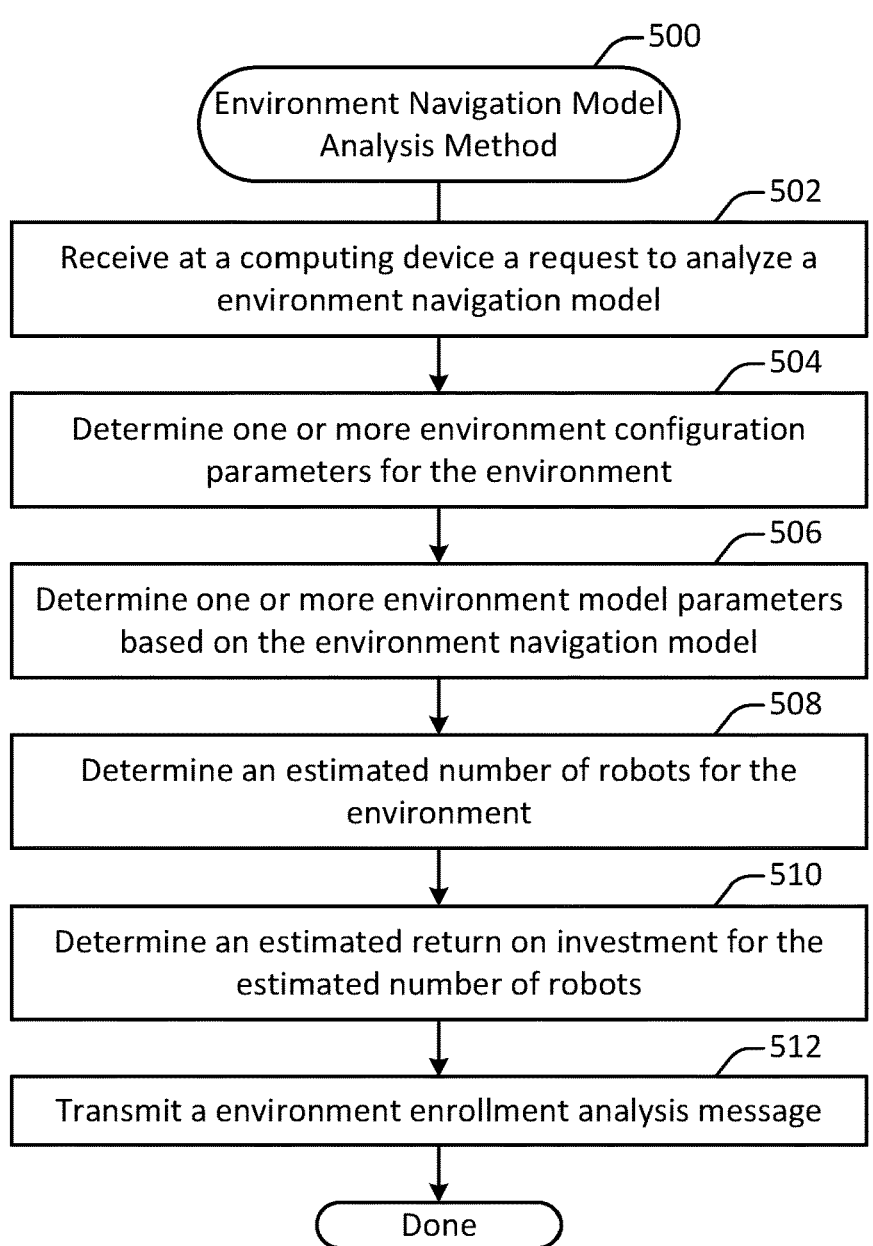
FIG. 5 illustrates a method for analyzing an environment navigation model, performed in accordance with one or more embodiments.

FIG. 5 illustrates a method 500 for analyzing an environment navigation model, performed in accordance with one or more embodiments. According to various embodiments, the method 500 may be implemented on any suitable computing devices, such as one or more of the computing devices described herein.

A request to analyze an environment navigation model is received at 502. One or more environment configuration parameters are determined at 504. According to various embodiments, examples of environment configuration parameters may include, but are not limited to: GPS coordinates corresponding with the environment, one or more tasks to be completed by robots at the environment, and a number of persons typically occupying the environment.

One or more environment model parameters are determined at 506 based on the environment navigation model. According to various embodiments, examples of environment configuration parameters may include, but are not limited to: physical dimensions of the environment, an internal layout for the environment, and information about items stored within the environment.

An estimated number of robots for the environment is determined at 508. According to various embodiments, determining an estimated number of robots may involve comparing information such as tasks to be completed by robots at the environment, physical dimensions of the environment, an internal layout for the environment, and a number of humans typically working at the environment.

An estimated return on investment is determined at 510 for the estimated number of robots. According to various embodiments, the estimated return on investment may be based on information such as the cost of human labor, an estimated number of hours saved by the estimated number of robots, and an estimated cost associated with the estimated number of robots.

An environment enrollment analysis message is transmitted at 512. According to various embodiments, the environment enrollment analysis message may be an email or any other suitable communication message. The environment enrollment analysis message may include any or all of the information determined in the method 500 shown in FIG. 5.

Figure 6:
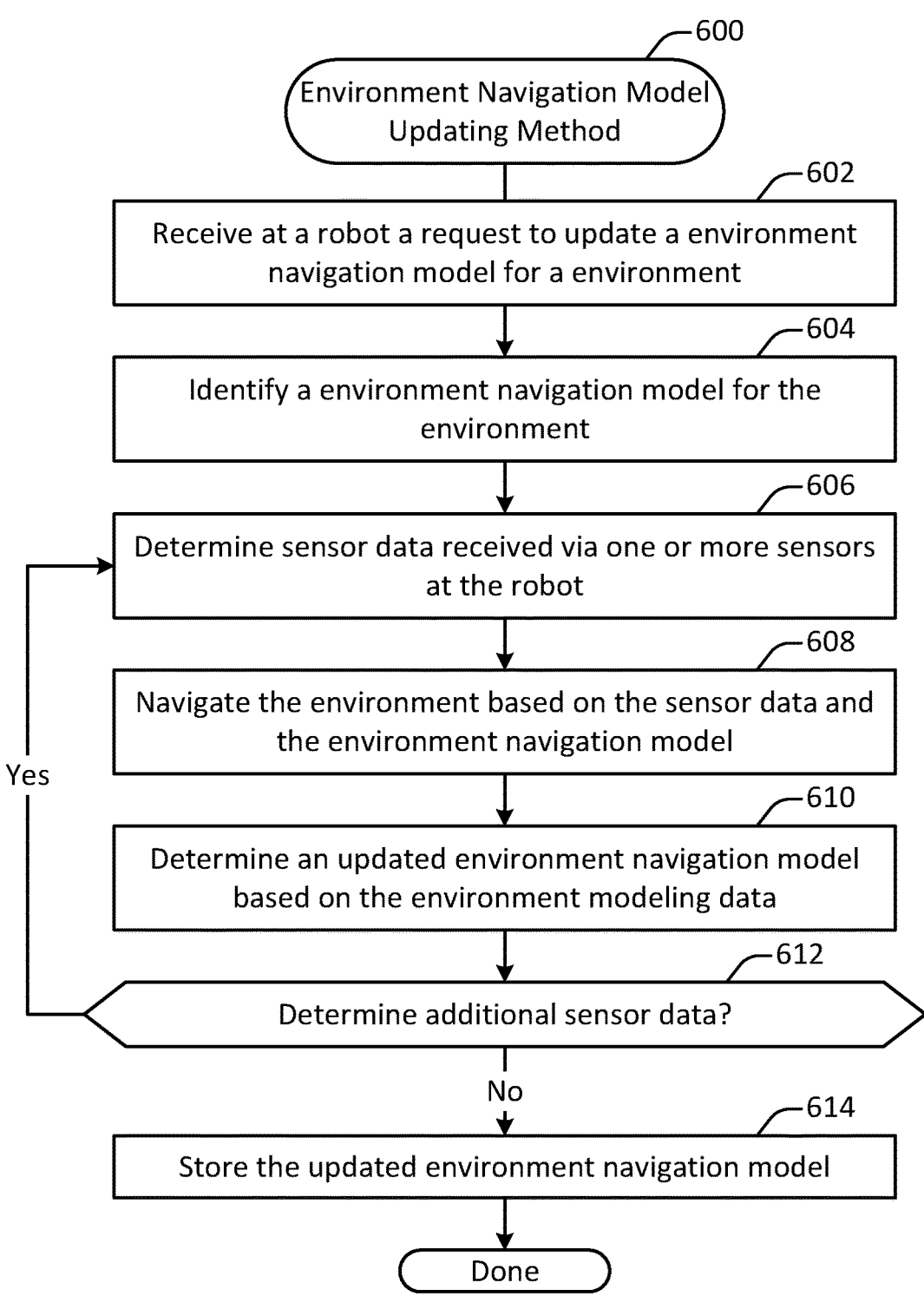
FIG. 6 illustrates an example of an environment navigation model updating method, performed in accordance with one or more embodiments.

FIG. 6 illustrates an example of an environment navigation model updating method 600, performed in accordance with one or more embodiments. The method 600 may be performed at one or more computing devices described herein, such as one or more devices shown in FIG. 2 or FIG. 3.

At 602, a request to update an environment navigation model for an environment is received at a robot. An environment navigation model for the environment is initialized at 604. According to various embodiments, initializing the environment navigation model may involve determining one or more parameters associated with the environment, such as one or more tasks regularly performed at the environment.

Sensor data is received at 606 via one or more sensors at the robot. According to various embodiments, the sensor data may include visual data collected from one or more cameras, depth scan information, accelerometer information, or any other data collected from the sensors at the robot.

At 608, the environment is navigated based on the sensor data and the environment navigation model. In some implementations, the environment may be navigated by an autonomous robot, such as a robotic cart. However, the robot may in some configurations navigate through the environment based at least in part on user input.

In some embodiments, the robot may navigate through the space as part of a mapping exercise. For instance, one or more robots may be instructed to navigate through an environment so as to collect data on all or various areas within an environment, to update the environment navigation model. Alternatively, or additionally, an environment navigation model may be automatically updated as part of the normal operation of the robot, for instance during its routine tasks.

The environment navigation model is updated at 610 based on the sensor data. In some implementations, updating the environment navigation model may involve implementing a Visual simultaneous localization and mapping (SLAM) process in which the position and orientation of one or more sensors at the robot are determined with respect to the environment, while simultaneously mapping the environment around the sensor. Additional details regarding the refinement of an environment navigation model are discussed with respect to the method 700 shown in FIG. 7.

According to various embodiments, two different visual SLAMs may be integrated. The first visual SLAM may be captured at an enrollment device, while the second visual SLAM may be captured at a robot. In this way, an initial place enrollment model captured by, for instance, a user operating a mobile phone, maybe updated using sensor data subsequently gathered at a robot that is potentially equipped with different types of sensors and capabilities.

A determination is made at 612 as to whether to determine additional sensor data. In some embodiments, the determination may be made based on any number of considerations. For example, additional sensor data may continue to be collected while an enrollment application is running. As another example, additional sensor data may continue to be collected while coverage levels for the environment as a whole or areas of the environment are insufficiently high.

The environment navigation model is stored at 616. In some embodiments, storing the environment navigation model may involve transmitting the model to a remote computing device, such as a cloud database.

Figure 7:
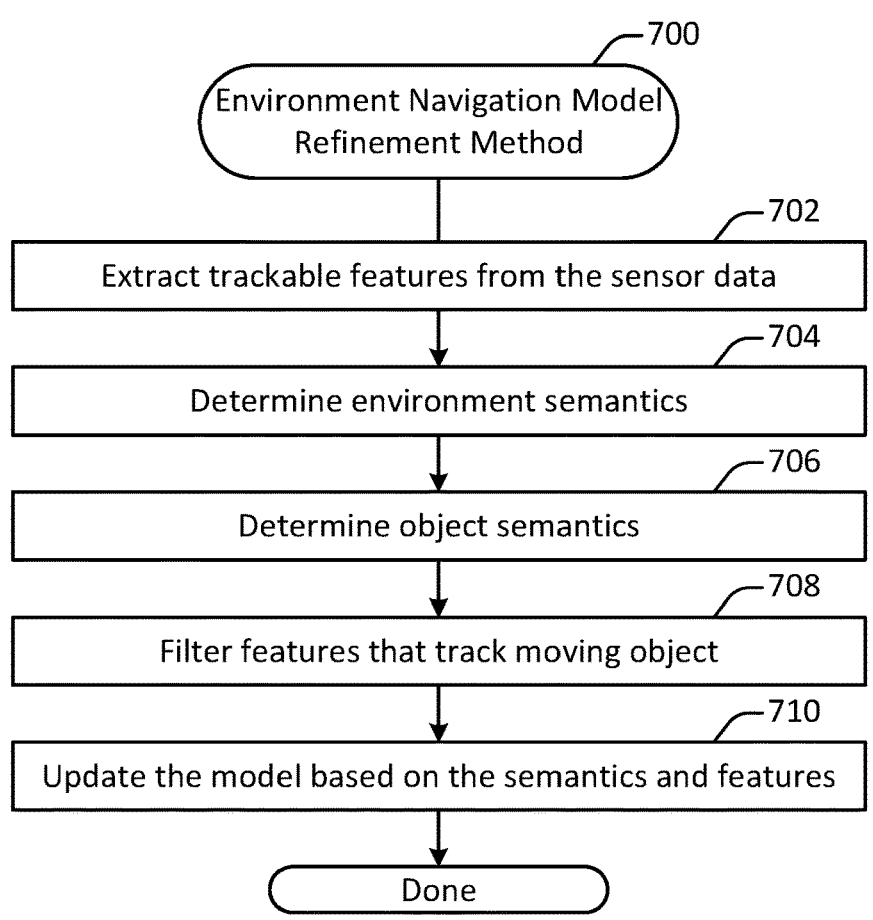
FIG. 7 illustrates a method for refining an environment navigation model, performed in accordance with one or more embodiments.

FIG. 7 illustrates a method 700 for refining an environment navigation model, performed in accordance with one or more embodiments. According to various embodiments, the method 700 may be performed when new sensor data for an environment is received. For example, the method 700 may be performed at operation 408 during the environment navigation model determination method. As another example, the method 700 may be performed at operation 608 during the environment navigation model updating method.

One or more trackable features are extracted from the sensor data at 702. In some embodiments, trackable features may include high-level features. For example, trackable features may include objects, QR-codes, or other such self-contained units. Alternatively, or additionally, trackable features may include low-level features such as edges or corners.

Environment semantics are determined at 704. According to various embodiments, environment semantics may identify features as characteristics of the environment. Such environmental features are typically fixed. For example, environment semantics may include ceilings, shelves, doors, windows, walls, floors, light fixtures, and/or other types of fixtures.

Object semantics are determined at 706. According to various embodiments, object semantics may include characteristics of objects within the environment. For instance, object semantics may distinguish between a box and a fire extinguisher. In this example, a box is an object that may readily move, while a fire extinguisher, though movable, may typically be located in the same place day-to-day.

In some embodiments, environment and/or object semantics may be determined based on any of a variety of types of information. For example, shape, color, and/or other visual information may be used to perform object recognition. As another example, objects may be observed at different points in time to determine whether or not they have moved.

According to various embodiments, features that track moving objects are filtered at 708. In some embodiments, movable objects may not be integrated into an environmental model because they are likely to be located in a different place when the area in which they were previously situated is later encountered.

The model is updated at 710 based on the semantics and features. According to various embodiments, updating the model may involve updating a set of environment semantics and object semantics associated with the environment.

Figure 8:
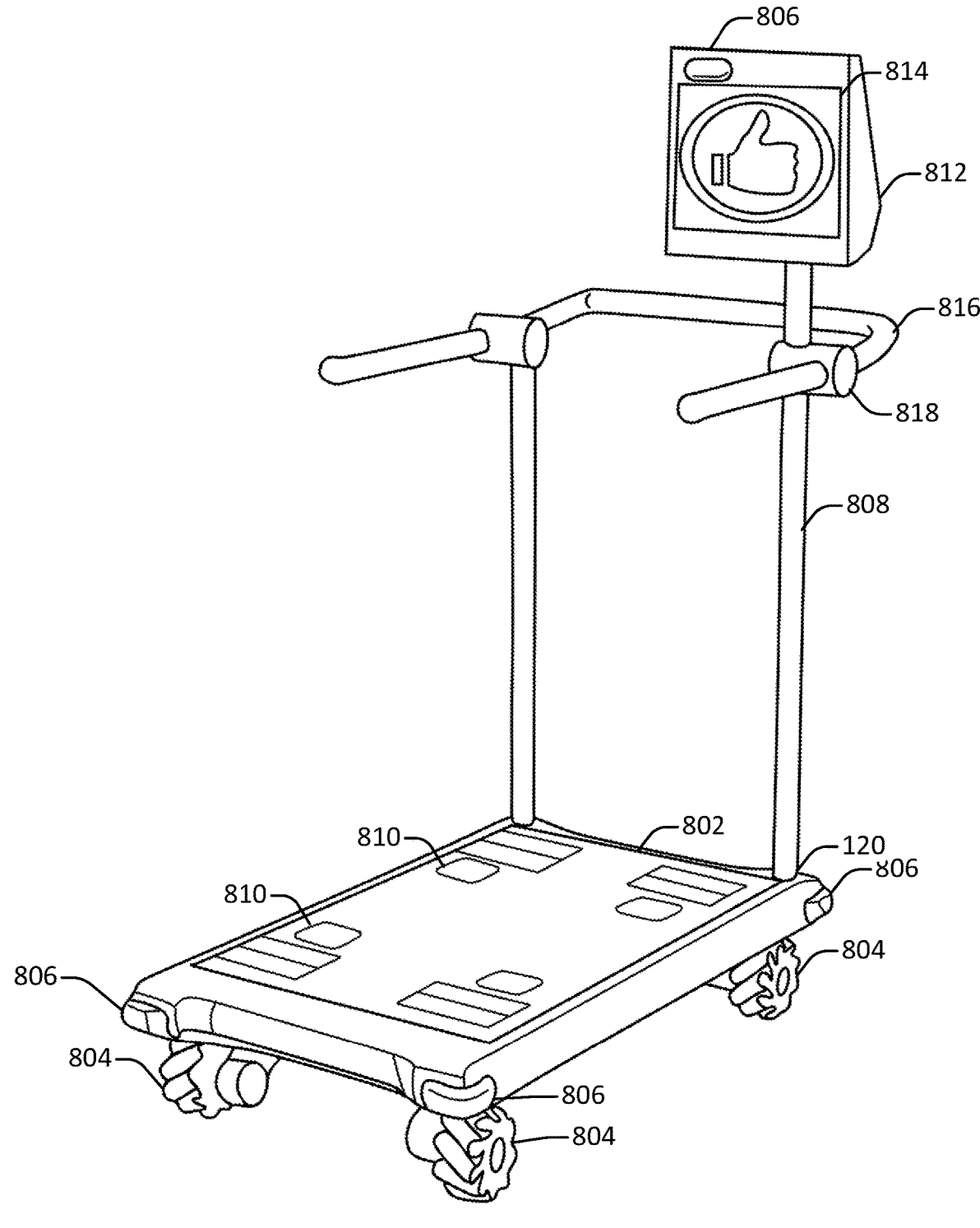
FIG. 8 illustrates a robotic cart, configured in accordance with one or more embodiments.

FIG. 8 illustrates a robotic cart 800, configured in accordance with one or more embodiments. The robotic cart 800 includes a base 802, a mobility apparatus 804, one or more sensors 806, and a hand rail 808.

According to various embodiments, the mobility apparatus may include one or more wheels, treads, legs, brakes, or other such elements. For example, in some configurations the robotic cart may include four Mecanum wheels, as shown in FIG. 8. However, other configurations of the mobility apparatus are possible.

The robotic cart base 802 may include one or more attachment points 810. According to various embodiments, an attachment point may provide one or more elements for adding a component or components to the base. Such elements may include, but are not limited to: power couplings, communication interfaces, and physical connection points. For example, power may be provided via a plug interface or via inductive charging. As another example, a communication interface may be configured to connect via Universal Serial Bus (USB) or any other suitable protocol. As yet another example, a physical connection point may be configured to connect a payload to the robotic cart via one or more bolts, clips, snaps, screws, or other such mechanical fasteners. The components that may be connected via such attachment points may include, but are not limited to: scissor lifts, shelving units, robotic arms, refrigeration units, cabinets, and conveyer belts.

According to various embodiments, sensors 806 may be located on the corners and/or edges of the base. The types of sensors may include, but are not limited to: optical sensors, stereo cameras, time-of-flight depth sensors, structured light depth sensors, sonar sensors, and lidar sensors. The robotic cart may be configured in a flexible way to incorporate various types of hardware and software sensor configurations.

In particular embodiments, sensor data may be processed by localized processing units such as circuit boards housing ARM processors located near the sensors. For instance, localized processing units may be equipped to implement the OpenCV framework for sensor data processing.

According to various embodiments, the base 802 may include one or more batteries, charging interfaces, communication interfaces, and/or central processing units (not shown). A central processing unit may receive information from a communication interface and the sensors 806 to determine a course of action. For example, the central processing unit may determine a path along which the robotic cart is to travel. As another example, the central processing unit may determine one or more instructions to transmit to a communication-equipped payload unit attached to the robotic cart. As yet another example, the central processing unit may determine one or more instructions to transmit to the human communication interface 814. As still another example, the central processing unit may determine one or more messages to transmit to a remote machine via a communication interface.

In particular embodiments, one or more sensors may be configured to detect irregularities in the floor around the robotic cart. Such irregularities may include, but are not limited to: stairs, walls, cliffs, bumps, and holes. The robotic cart may be configured to not select a course of action that would cause the cart to traverse such an irregularity in order to avoid, for instance, falling off a cliff or down stairs, jostling a payload by traversing a bump, or having a wheel become stuck in a hole.

According to various embodiments, one or more top units 812 may be attached to the hand rail 808. A top unit 812 may include one or more communication interfaces 814 and/or one or more sensors 806. When located on the top unit 812, a sensor 806 may help to identify people, the contents of the cart, and/or aspects of the environment in which the cart is located.

According to various embodiments, the communication interface 814 may include a display screen, speaker, microphone, or other such communication elements. The communication interface 814 may be configured to receive input from a person. For example, the communication interface 814 may include a touch screen display. As another example, the communication interface 814 may be configured to detect hand gestures or other nonverbal communication. As yet another example, the communication interface 814 may be configured to detect voice commands.

In some embodiments, a display screen may be configured to rotate. For instance, the robotic cart may be configured to detect the presence of a human in an area proximate to the robotic cart. Then, the robotic cart may cause the display screen to rotate about one or more axes to face the human. Such an approach may allow the human to more easily view the contents of the display screen. In particular embodiments, the display screen may be updated to indicate to the human that the human has been detected. For instance, the display screen may be updated to display a face or a set of touch screen controls.

In some implementations, the communication interface 814 may be configured to communicate information to humans or other robots. For example, the communication interface 814 may be configured to communicate information related to the robotic cart's status or intended course of action. The intended course of action may include information such as a path that the robotic cart plans to traverse, an action related to the payload, or a sequence of tasks that the robotic cart plans to complete. The status may include information related to battery charge, mechanical performance, mobility system status, sensor operation, or other such data.

According to various embodiments, a robotic cart may include one or more hand rails. A hand rail 808 may include one or more handlebars 816. A handlebar may be configured to allow the cart to collect tactile information. For example, a handlebar 816 may be connected to one or more force torque sensor in a connecting joint 818 or a connecting joint 820. As another example, a handlebar 816 may be equipped with one or more rotational affordances that detect a rotational force applied by a human. As yet another example, a handlebar 816 may be equipped with one or more touch sensors, such as capacitive, resistive, or beam break touch sensors.

According to various embodiments, sensors associated with one or more handlebars may be configured to collectively capture various information. Such information may include, but is not limited to: whether a human has grasped the handlebar with one or two hands, an amount of force that the human is exerting on the handlebar, and a direction of force that the human is exerting on the handlebar. Such information may be transmitted to the central processing unit.

According to various embodiments, the central processing unit may be configured to employ the sensor information to perform a variety of tasks. In an autonomous state, the robotic cart may be configured to navigate an environment to perform a task such as transporting an object from one location to another. In a directed state, the robotic cart may be configured to receive physical input from a human via the handlebars to move in a direction indicated by the human. Other types of human-directed actions, such as the operation of a robotic arm, may also be performed.

In particular embodiments, different types of user input may provide for different types of operational responses. For example, when the robotic cart detects that a single human hand has been placed upon the handlebar, the robotic cart may halt and wait for further input. As another example, when the robotic cart detects that two human hands have been placed upon the handlebar, the robotic cart may enter an "ice cube" mode in which it employs the mobility apparatus to move in two dimensions over the floor in a direction determined based on the force torque sensors coupled with the handlebar. In this way, the human may easily move the robotic cart in a force-assisted manner.

In particular embodiments, one or more torque sensors (and/or force torque sensors) may be used. The detection of torque may be used to determine when to rotate the robotic cart. The robotic cart may be rotated relative to a point in the base component. For instance, the robotic cart may be rotated around an axis. Such a point may be the center of the base component or a different point. For instance, the point of rotation may be dynamically configuration.

In particular embodiments, one or more torque sensors (and/or force torque sensors) may detect a magnitude of rotational force. Then, the robotic cart may be rotated with a rotational rate (e.g., velocity, acceleration) consistent with the magnitude of the rotational force. As with other aspects of mobility, rotational movement may be accomplished by a control unit receive one or more messages from a sensor unit and then communicating with a mobility apparatus (which may include, for instance, four Mecanum wheels) to move the robotic cart in the designated translational and/or rotational direction.

According to various embodiments, the robotic cart may include one or more input sensors of various types (e.g., force, force torque, torque, directional) that collectively may sense a variety of physical user input. Such sensors may collectively provide information such as a direction of translational force, a velocity of translational force, a direction of rotational force, a velocity of rotational force, or some combination thereof.

According to various embodiments, a robotic cart may be configured in a manner different from that shown in FIG. 8. For example, a robotic cart may be configured as a pallet jack operable to lift and transport standard pallets that are either empty or holding various items. As another example, a robotic cart may be configured to transport a person standing on the robotic cart. As yet another example, a robotic cart may be configured to transport a specialized type of item, such as a standard 55-gallon drum.

Figure 9:
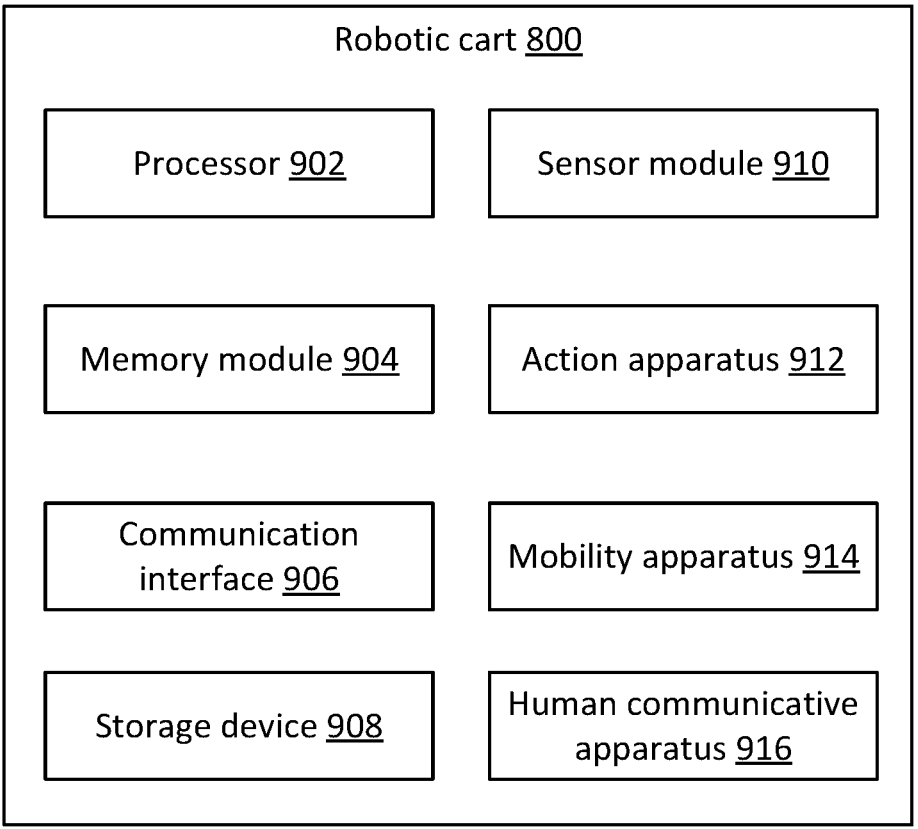
FIG. 9 illustrates an architecture diagram for a robotic cart, configured in accordance with one or more embodiments.

FIG. 9 illustrates an architecture diagram for a robotic cart 800, configured in accordance with one or more embodiments. According to various embodiments, the robotic cart 800 may be configured in a variety of form factors. The robotic cart 800 includes a processor 902, a memory module 904, a communication interface 906, a storage device 908, a sensor module 910, an action apparatus 912, a mobility apparatus 914, and a human communicative apparatus 916.

According to various embodiments, the robotic cart 800 may include one or more processors 902 configured to perform operations described herein. The memory module 904 may include one or more transitory memory elements, such as random access memory (RAM) modules. The storage device 908 may be configured to store information such as computer programming language instructions and/or configuration data.

In some implementations, the robotic cart 800 may include one or more communication interfaces 906 configured to perform wired and/or wireless communication. For example, the communication interface 906 may include a WiFi communication module. As another example, the communication interface 906 may include a wired port such as a universal serial bus (USB) port, which may be connected when the robot couples with a docking or charging port or device.

According to various embodiments, the sensor module 910 may include one or more of various types of sensors. Such sensors may include, but are not limited to: visual light cameras, infrared cameras, microphones, Lidar devices, Radar devices, chemical detection devices, near field communication devices, and accelerometers.

In particular embodiments, the sensor module 910 may communicate with one or more remote sensors. For example, an environment may be equipped with one or more of various types of sensors, data from which may be relayed to robots within the vicinity.

According to various embodiments, the action apparatus 912 may be any one or more devices or components used to perform a task. Such devices may include, but are not limited to: robotic arms, other types of manipulators, chemical applicators, light sources, suction devices, and sensors.

According to various embodiments, a device may be attached to the robotic cart 800 in any of various ways. For example, the device may be attached in a fixed orientation relative to a robot drive mechanism, for instance on the base of the robotic cart. As another example, the device may be attached to the robotic cart via a robotic arm having any of a variety of possible geometries, which in turn may be attached to the base or handlebars of the robotic cart.

According to various embodiments, the mobility apparatus may include one or more of any suitable mobility devices. Such devices may include, but are not limited to, one or more motorized wheels, balls, treads, or legs. In some configurations, the mobility apparatus may include one or more rotational and/or gyroscopic elements configured to aid in mobility and/or stability.

In particular embodiments, a mobility apparatus may include some number of Mecanum wheels. A Mecanum wheel is an omnidirectional wheel design for a vehicle to move in any direction. For instance, a Mecanum wheel may be implemented as a tireless wheel with a series of external rollers obliquely attached to the circumference of its rim. When different Mecanum wheels are configured as an independent non-steering drive wheels each with their own powertrain, spinning can generate a propelling force perpendicular to the roller axle, which can be vectored into a longitudinal and a transverse component in relation to the vehicle.

According to various embodiments, the robot may communicate directly with a human via the human communicative apparatus 916. The human communicative apparatus 916 may include one or more components for conducting visible and/or audible communication with a human. For instance, the human communicative apparatus 916 may include one or more display screens, LEDs, motors, robotic arms, motion sensors, speakers, microphones, or other such components. For example, the human communicative apparatus 916 may include a display screen coupled with a motor that may be used to provide visual cues about the robot's activities.

In particular embodiments, the robotic cart 800 may be configured to communicate directly or indirectly with other robots in order to accomplish its tasks. For example, robots may share information to build up an accurate model of an environment, identify the location and/or trajectory of humans, animals, objects, or perform social accommodation. As another example, robots may coordinate to execute a plan. For instance, one robot may be interrupted in a task due to social accommodation. The robot may then move on to another task, while a different robot may then later perform the interrupted task. As yet another example, robots may coordinate to perform a single task.

Figures 10A, 10B, 10C, 10D:
FIG. 10A, FIG. 10B, FIG. 10C, and FIG. 10D illustrate robotic carts, configured in accordance with one or more embodiments.

FIG. 10A, FIG. 10B, FIG. 10C, and FIG. 10D illustrate robotic carts, configured in accordance with one or more embodiments. In FIG. 10A, the robotic cart 1000 is configured to include two half shelves 1002 with attachment points 1004 and 1006 at the base of the cart near the hand rail apparatus and on the hand rail apparatus itself. In FIG. 10B, the robotic cart 1020 is configured with two full shelves via a shelving unit 1008 mounted to the base of the cart.

In FIG. 10C and FIG. 10D, the robotic cart 1040 is shown configured with a scissor lift, in a collapsed position in FIG. 10C and an extended position in FIG. 10D. An object manipulation mechanism 1012 includes one or more components for manipulating an object. Such components may include, but are not limited to: one or more conveyer belts, grabber arms, backstops, pushing devices, or suction devices.

FIG. 11A, FIG. 11B, and FIG. 11C illustrate robotic carts, configured in accordance with one or more embodiments. In FIG. 11A, the robotic cart 1100 is configured to include a cabinet 1102 mounted on top of the cart base 1104. In some implementations, the cabinet 1102 may be configured with power to perform one or more operations. Such operations may include, but are not limited to: refrigeration, sterilization, and inventory tracking. The power and/or one or more instructions may be received from the robotic cart, for instance through connection points in the base. In FIG. 11B, the robotic cart 1120 is configured with an organizational unit 1106 mounted on the base 1104.

In FIG. 11C, two robotic carts are shown cooperating to perform a task. The robotic cart 1140 is equipped with a scissor lift 1108 that includes a pushing mechanism 1114. The scissor lift 1108 and pushing mechanism 1114 are used to transfer an item 1110 onto the shelf of the robot 1160.

Figure 12:
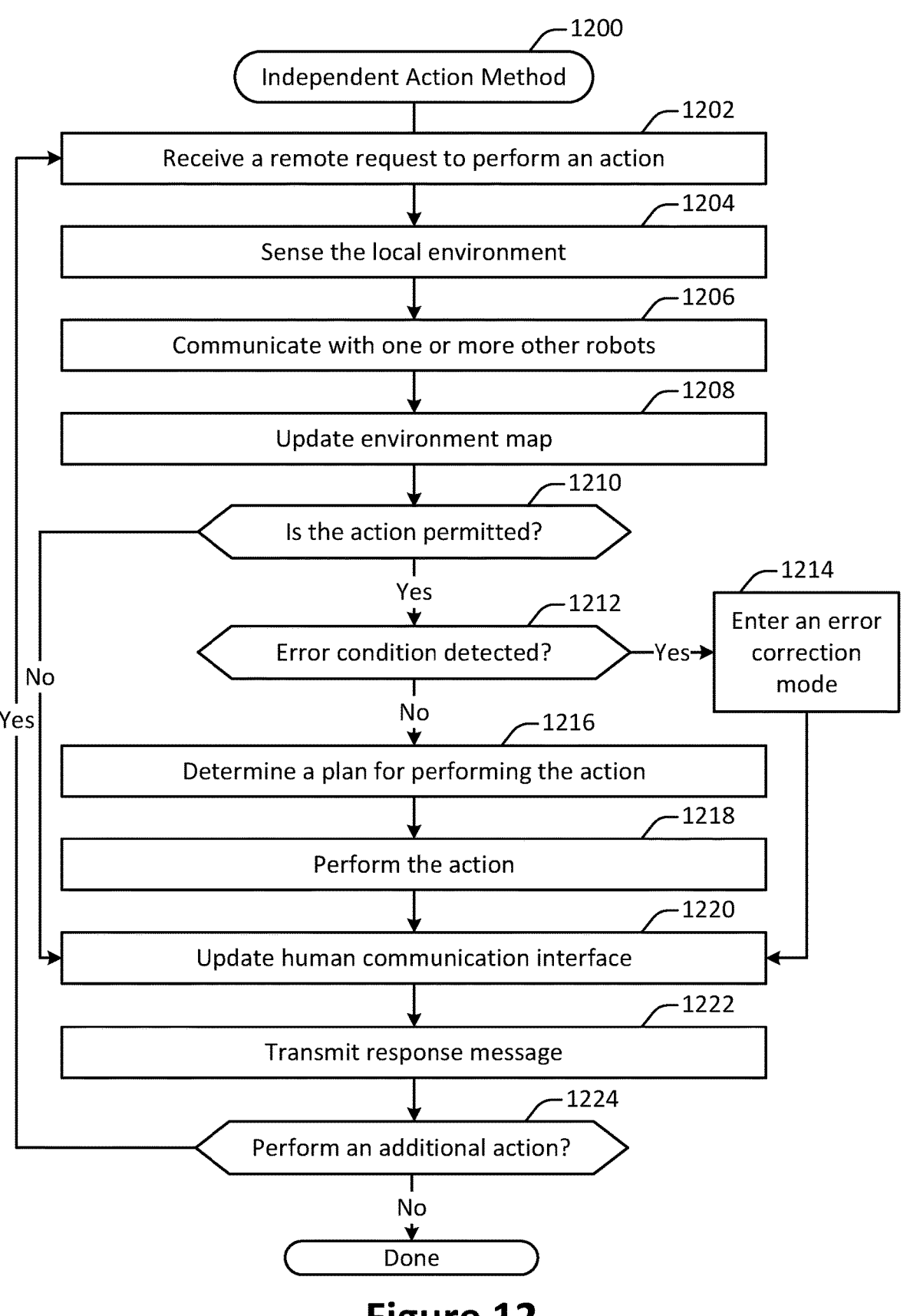
FIG. 12 illustrates a method for independent action, performed in accordance with one or more embodiments.

FIG. 12 illustrates a method 1200 for independent action, performed in accordance with one or more embodiments. The method 1200 may be performed by a robotic cart and may facilitate the performance of an action by the robotic cart. Importantly, the operations shown in FIG. 12, and indeed in all methods described herein, may be performed in an order different than that shown. For example, operations may be performed in parallel, or in a different sequence. As another example, a robotic cart control unit may execute operations in an event-driven fashion, with the specific sequence depending on the situation. As yet another example, one or more operations may be omitted.

A request to perform an action is received at 1202. According to various embodiments, the request may be received from a robotic cart fleet control unit. For example, a robotic cart fleet control unit may direct and/or coordinate activities across and among robotic carts within an environment such as a warehouse. For example, a robotic cart fleet control unit may transmit an instruction to the robotic cart to transport an item from a source location to a destination location within a warehouse. Alternatively, or additionally, a robotic cart may coordinate with other robotic carts, for instance in a peer-to-peer fashion, to assign and/or perform tasks.

The local environment is sensed at 1204. According to various embodiments, sensing the local environment may involve receiving sensor data from one or more sensors at the robotic cart. For example, sensing the local environment may involve receiving information from optical sensors located on the robotic cart. However, as discussed herein, a variety of numbers and types of sensors may be used.

The robotic cart may communicate with other robots at 1206. The other robots may include other instances of the robotic cart, other instances of robotic carts arranged in different configurations, other types of robots, or any type of remote computing device relevant to the processing performed in the method 1200.

In particular embodiments, the communication performed at 1206 may be performed in a local fashion. For instance, the robotic cart may communicate with one or more robots located within a designated radius of the robotic cart.

In some implementations, the communication performed at 1206 may be used to receive additional environmental mapping information. For example, other robots may communicate information such as a state of the environment around those other robots. As another example, other robots may convey information such as sensor data received from one or more fixed sensors located within the environment.

In some implementations, the communication performed at 1206 may be used to receive information about tasks and operations being performed or scheduled to be performed by the other robots. For example, another robot may convey information about a path through the environment along which the other robot plans to move. As another example, another robot may convey information about a particular task that the other robot is in the process of performing or plans to perform in the future. Such information may be used to assist the focal robot in its own task planning and performance, such as by avoiding a path that is predicted to intersect with a predicted path for a different robot.

An environment map is updated at 1208. According to various embodiments, a robotic cart may maintain a map of its environment. The map may be created and/or updated based on information received from a robotic cart fleet control unit, from communication with other robots, and/or information received from sensors at the robotic cart. Updating the environment map may involve operations that may include, but are not limited to: updating locations for robots within an environment, updating locations of items within an environment, updating information about the environment itself, and/or updating information about blocked passages or other obstructions within the environment.

In some implementations, a robotic cart may receive a scene graph from a robotic cart fleet control unit at a designated interval, such as every 30 seconds. Similarly, the robotic cart may report to the robotic cart fleet control unit where the robotic cart estimates it is located within the scene graph at a designated interface, such as every 30 seconds.

A determination is made at 1210 as to whether the action is permitted. Additional details related to determining whether the action is permitted are discussed with respect to the method 700 shown in FIG. 7.

A determination is made at 1212 as to whether an error condition has been detected. According to various embodiments, any or all of a variety of error conditions may occur. Such conditions may include, but are not limited to: insufficient battery power to perform the requested action, a battery level below a designated threshold, a mechanical malfunction, a software error, and/or an environmental issue. For example, the robotic cart may determine that it has insufficient battery power to both perform a task and then subsequently return to a charging station. As another example, the robotic cart may determine that aspects of the environment or mechanical failure have caused the robotic cart to become stuck.

If an error condition has been detected, then an error correction mode is entered into at 1214. According to various embodiments, entering into the error correction mode may involve transmitting a message indicating that the robot has encountered an error. For example, a message may be communicated to a robotic cart fleet control unit.

In some implementations, entering into the error correction mode may involve providing a local indicator of the error condition. For example, the robotic cart may update a display screen to display a red "thumbs down" or other type of error indication symbol or message. As another example, the robotic cart may display an audible warning, a flashing light, or perform another type of alert function.

In some embodiments, entering into the error correction mode may involve abandoning the task and instead taking an action to correct the error condition. For example, a low battery condition may be corrected by moving to a charging station. As another example, some types of mechanical errors may be corrected by moving to a repair station.

A plan for performing the action is determined at 1216. According to various embodiments, determining the plan for performing the action may involve such operations as determining a path through an environment, determining a speed for moving along the path, and/or determining one or more instructions to provide to a payload having a mechanical capability.

In some embodiments, determining a plan of action may involve determining a route. The route may be determined based on various criteria, such as speed, distance, congestion, the current locations of humans and/or other robots, predicted future locations of humans and/or robots, or any other suitable information.

In some embodiments, determining a plan of action may involve determining a speed for moving along a route. For example, the robotic cart may move at a high rate of speed (e.g., 2 m/s) when no other humans or robots are present. However, the robotic cart may move at a lower rate of speed (e.g., 0.5 m/2) when humans are within a designated distance (e.g., 12 m) of the robotic cart.

In some embodiments, determining a plan of action may involve determining an instruction to send to a mechanical payload. For example, a mechanical arm, conveyer belt, scissor lift, or other apparatus may be instructed to perform an action such as picking an item from a shelf and placing it onto a payload area of the robotic cart, pushing an item off of a payload area of the robotic cart, raising or lowering an item in a vertical direction.

In particular embodiments, the plan of action may be periodically updated. For example, a robotic cart may determine that a human or another robot has blocked the planned path. At that point, the robotic cart may need to plan a different path and execute the new plan.

In particular embodiments, the plan of action may be determined based at least in part on the plans of action of other robots. For example, robotic carts may coordinate to ensure that they do not converge on the same intersection at the same time and while traveling at a high rate of speed.

If the action is permitted, then the action is performed at 1218. According to various embodiments, performing the action may involve, for instance, moving the robot from one location to another along a determined path, moving an item onto or off of the robotic cart, performing an action with a mechanical payload such as a robotic arm or conveyer belt, and/or performing any other action or actions that the robotic cart is capable of performing. Thus, performing the action may involve transmitting an instruction to a mobility apparatus, a mechanical payload, a human communication interface, or any other element of the robotic cart.

A human communication interface is updated at 1220. According to various embodiments, updating the human communication interface may involve presenting information indicative of the status, current actions, or future actions of the robotic cart. For example, a display screen may display a green "thumbs up" symbol if the robotic cart is functioning appropriately. As another example, a speaker may emit a beep that indicates the presence of the robotic cart and/or conveys information concerning the robotic cart.

A response message is transmitted at 1222. According to various embodiments, the response message may be transmitted to a robotic cart fleet control unit. The response message may include information such as whether the action was permitted, whether an error condition has been detected, whether the action has been initiated, whether the action has been completed, a degree of progress in performing the action, and/or an amount of time estimated for performing the requested action.

A determination is made at 1224 as to whether to perform an additional action. According to various embodiments, a robotic cart may continue to perform additional actions until a designated condition is met. Such conditions may include, but are not limited to: the receipt of an instruction to deactivate, the receipt of an instruction to travel to a charging station or other location, the detection of an error condition, and/or a determination that no additional actions are requested.

Figure 13:
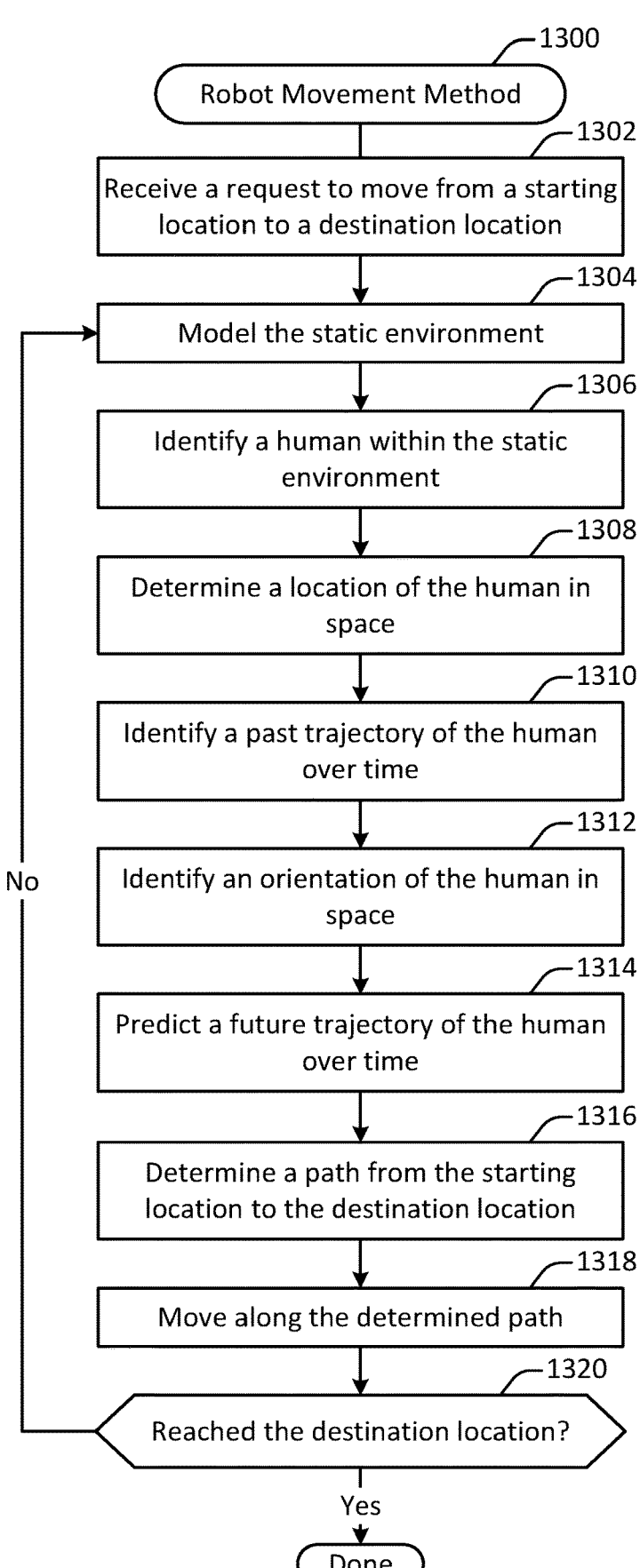
FIG. 13 illustrates a method for moving a robot, performed in accordance with one or more embodiments.

FIG. 13 illustrates a method 1300 for moving a robot, performed in accordance with one or more embodiments. The method 1300 may be performed in order to position the robot for performing a task. Alternatively, or additionally, the method 1300 may be performed to move the robot to a location where it does not interfere with human activity. As still another example, the method 1300 may be performed while the robot is performing a task, such as monitoring an area.

A request to move from a starting location to a destination location is received at 1302. According to various embodiments, the destination location may be determined based on any of a variety of considerations. For example, the robot may receive an instruction to move to a designated location. As another example, the robot may determine the location based on a task or set of tasks that the robot is attempting to perform.

The static environment is modeled at 1304. In some implementations, the static environment may be modeled based on sensor data received from one or more of a visible light camera, an infrared camera, a depth sensor, radar, lidar, or any other suitable sensor. The model of the static environment may indicate features such as walls and/or fixed objects such as tables.

In some embodiments, a single sensor may include more than one type of functionality. For instance, a camera may detect both visible and infrared light. In particular embodiments, a robotic cart may include an infrared light source for spreading light that may then be detected by an infrared camera.

In particular embodiments, information about the static environment may be predetermined. For instance, a robot may be provided with a two-dimensional or three-dimensional map of an environment.

In particular embodiments, information about the static environment may be received from a remote data source. For example, one or more sensors in an environment, such as sensors located on another robot, may collect information about the environment. Such information may then be transmitted to the robot, which may use the information to replace or supplement locally collected information.

A human within the static environment is identified at 1306. The human may be identified by performing object recognition, for instance via pre-trained neural networks, on the sensor data. For simplicity, FIG. 13 is described as planning robotic movement in an environment with a single human. However, such operations may be applied more generally to environments with one or more humans, robots, machines, vehicles, animals, other animate objects, or some combination thereof.

In some embodiments, a human may be identified at least in part by scanning an environment with a sensor having limited capabilities. For example, visual light, radar, or lidar sensors may be used to detect objects that may or may not be humans. As another example, a laser may scan the room, for instance at a few inches from the ground to identify objects that may or may not be humans. Such sensors may provide limited information, such as a distance from the robot to an object in a particular direction. However, a pattern in the distance in a particular direction may be recognized as potentially indicating the presence of a human.

In some implementations, an object identified as a candidate by a sensor having limited capabilities, such as a two-dimensional laser depth sensor, may then be subjected to a more comprehensive analysis, such as one or more cameras. For instance, one or more sensors such as cameras may be used to capture monocular visual data, binocular visual data, or other visual data of the object. Such cameras may be equipped with sophisticated features such as pan and tilt, which may be used to focus on an object identified by the less sophisticated sensors. Then, an object recognition procedure may be used on the captured data to confirm whether the object is a person and to determine various information about the person, such as the person's role or identity.

In particular embodiments, a sensor may combine active depth and passive optical sensing capabilities. For example, a camera may include a projected structured infrared light component that projects a pattern of infrared light onto the surroundings, which may be used to determine distance from the camera to the objects. As another example, a camera may include depth detection based on time-of-flight of projected infrared light. In either case, the same camera may also detect visible light.

In particular embodiments, once an object is identified as a person, the person may be subject to more refined identification in which the person is identified. For instance, a human may be classified based on age, size, a number of times that the human previously has been observed, or any other characteristics. For instance, a human may be classified at least in part based on a badge, clothing such as a uniform, or other visual indicators of the human's role in the workplace. The human may then be treated differently based on the human's past interactions with the robot. For example, a human who has never been observed may be given a relatively wide berth because the robot may be unfamiliar to the human. As another example, a child may be given a relatively wide berth. As another example, a human who is identified as having been near the robot many times in the past may be given a relatively narrow berth since the robot is likely familiar to the human.

A location of the human in space is determined at 1308. In some implementations, the human may be positioned in a virtual two-dimensional or three-dimensional map of the environment. The human may be located in space by using information captured by one or more depth sensors, optical sensors, laser sensors, lidar sensors, and/or other sensors. Positioning the human in space may allow the robot to reason about the human, for instance for the purpose of trajectory mapping and/or route planning.

A past trajectory of the human over time is identified at 1310. According to various embodiments, the past trajectory of the human over time may be identified by analyzing historical sensor data. For example, data from a two-dimensional laser scanner over time may be used to plot the location of the human over time in the virtual two-dimensional or three-dimensional map of the environment. As another example, video data from one or more cameras may be used for tracking people or objects.

An orientation of the human in space is determined at 1312. In some implementations, the orientation may characterize the position of the human as standing, sitting, kneeling, or arranged in some other position. Alternatively, or additionally, the orientation may characterize the position of the human as facing in a particular direction relative to the environment.

In particular embodiments, the orientation may be determined based at least in part on the past trajectory of the human. For example, if the human is moving along a trajectory, the human may be presumed to be facing in the direction of the trajectory.

In particular embodiments, the orientation may be determined based at least in part on other physical objects. For example, if the human is sitting in a chair, the orientation may be determined at least in part by the position of the chair.

Movement of the identified humans within the static environment is predicted at 1314. According to various embodiments, movement of humans may be predicted via heuristics. For example, if a person opens a door, the person is likely to move through the door in the near future. As another example, when a small group of people are positioned near one another and talking intensely, they are likely to continue talking unless one of the principals has intimated through gesture, spoken words, or body motion that they are leaving. As yet another example, when a person makes a gesture such as a "come through" wave, the robot may predict that the person is waiting for the robot to move. In such a situation, the robot may proceed and may make a social acknowledgement of the person's action. Such a social acknowledgement may include a message on a screen, a light, a spoken message, or another audible notification.

In some implementations, movement of humans may be predicted via past actions. For example, the robot may have observed in the past that a particular human tends to follow a particular path through a space. As another example, the robot may identify a person's likely trajectory based on the person's role. For instance, the robot may expect a maintenance worker to enter a particular door, which may never be entered by members of the public.

A path from the starting location to the destination location is determined at 1316. The robot moves along the determined path at 1318. According to various embodiments, the robot may give a wide berth to people whenever possible, based on the predicted path of each person. For example, the robot may determine a path to the destination that minimizes travel time while at the same time staying at least 6 feet from each person when in an open area. In a more closed area such as a hallway in which less room is available, the robot may plan the path so as to stay as far from each person as possible. In general, the robot may plan a path in such a way as to avoid requiring humans to alter their activities to accommodate the robot. The robot may alter both its path and its speed in order to enforce this distancing.

In particular embodiments, the robot may alter its path based on the identity of the person. For example, the robot may determine a path that places it relatively further from people who it has not encountered before, even if such a path is longer than necessary. Such people are unknown to the robot, and the robot may be unknown to such people, rendering the actions of such people less predictable than people who have interacted with the robot before. As another example, the robot may determine a path that places it relatively further from small children or animals even if such a path is longer than necessary since animals and small children may be inherently unpredictable. As yet another example, the robot may determine a path that places it relatively further from humans whose behavior the robot cannot accurately predict. Such people may include, for instance, maintenance workers moving rapidly between surfaces in a space, doctors moving from patient to patient in a hospital setting, or children playing.

A determination is made at 1320 as to whether the destination location has been reached. If not, the routine may continue until the destination is reached. That is, the robot may continue to model the environment and the location of people to execute the movement in a socially appropriate manner.

According to various embodiments, the techniques described in FIG. 13 may be used to move the robot relative to any or all of a variety of obstacles. For example, although the method 1300 is described with respect to moving a robot to a destination when a single human is present, the techniques may be applied to environments in which any number of humans are present. As another example, the method 1300 may be applied to move the robot to a destination in which an environment includes one or more animals.

In some implementations, the method 1300 may be applied to move the robot to a destination in which an environment includes one or more movable inanimate objects, such as other robots. The movement of objects that are not self-directed may be predicted via a physics-based simulation. For example, a ball that is bouncing or rolling down a hill may be predicted to continue bouncing or rolling down a hill. The movement of robots may be predicted at least in part based on communication with those robots. Alternatively, or additionally, robots may be modeled in a manner similar to humans.

Figure 14:
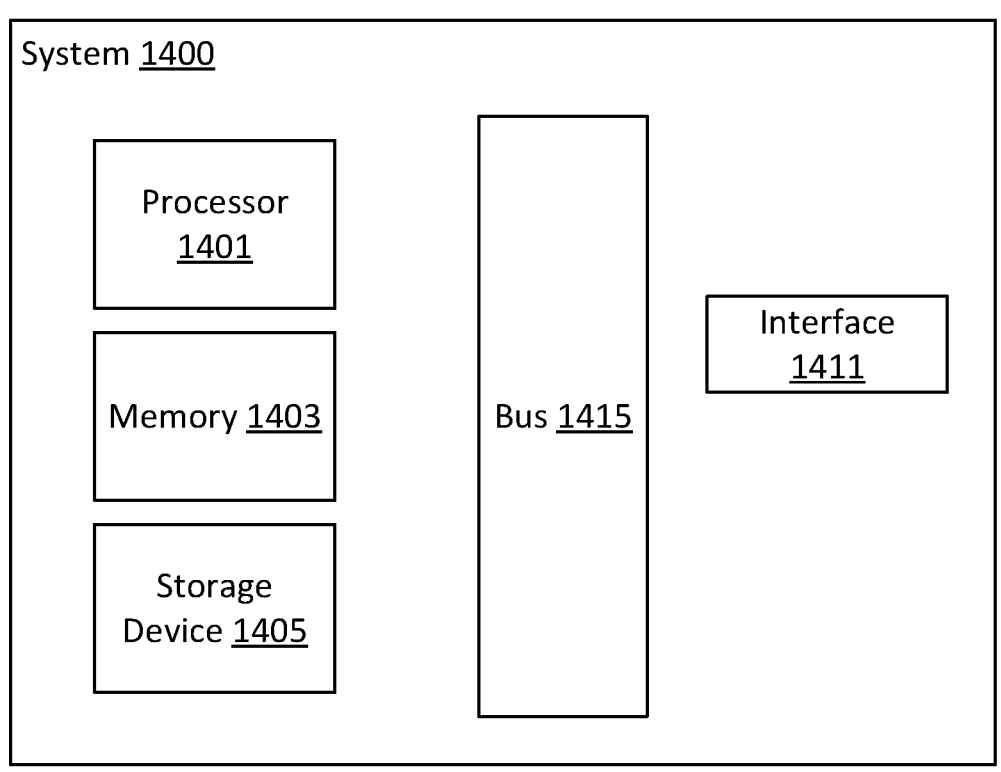
FIG. 14 illustrates one example of a computing device, configured in accordance with one or more embodiments.

FIG. 14 illustrates one example of a computing device, configured in accordance with one or more embodiments. According to various embodiments, a system 1400 suitable for implementing embodiments described herein includes a processor 1401, a memory module 1403, a storage device 1405, an interface 1411, and a bus 1415 (e.g., a PCI bus or other interconnection fabric.) System 1400 may operate as variety of devices such as robot, remote server, or any other device or service described herein. Although a particular configuration is described, a variety of alternative configurations are possible. The processor 1401 may perform operations such as those described herein. Instructions for performing such operations may be embodied in the memory 1403, on one or more non-transitory computer readable media, or on some other storage device. Various specially configured devices can also be used in place of or in addition to the processor 1401. The interface 1411 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

FIG. 15 illustrates a method 1500 for enrolling an object, performed in accordance with one or more embodiments. According to various embodiments, the method 1500 may be implemented at any suitable computing system or device.

An input object model for an object type designated for object enrollment is identified at 1502. According to various embodiments, the input object model may be a 3D representation such as a CAD model.

An environment model for an environment to contain objects of the object type is determined at 1504. According to various embodiments, the environmental model may be determined as discussed with respect to FIGS. 1-7.

A capture device model for a mobile capture device associated with the environment is determined at 1506. For example, the type of mobile capture device used to capture images of physical examples of the object type is determined. An example of such a mobile capture device is discussed with respect to the device 300 shown in FIG. 3.

An environment-specific object model is determined at 1508 based on the input object model, the environment model, and the capture device model. Additional details regarding the determination of an environment-specific object model are discussed with respect to the method 1700 shown in FIG. 17.

FIG. 16 illustrates an architecture diagram 1600 for an object enrollment system, configured in accordance with one or more embodiments. At 1602, a physical object in an environment is shown. In some embodiments, at 1608, sensor of the object may be captured at a mobile computing device, for instance via a capture application. Examples of sensor data may include, but are not limited to, LiDAR data, RGB camera data, RGB-D visual and depth camera data, and/or inertial measurement unit (IMU) data captured from an IMU.

According to various embodiments, the sensor data of the object may be processed in either or both of two ways. First, the camera data and/or the LiDAR data may be processed at the capture device to produce an object file. Second, at 1610, the data may be processed offline, for instance using the Photogrammetry application or another suitable processing application.

At 1604, a 3D representation of the object is shown. For instance, the 3D representation may be a CAD model. At 1606, an environmental model is shown. According to various embodiments, information about the environmental context may be captured using 2D capture and/or 3D capture via a mobile computing device.

In particular embodiments, input from the real object may be used instead of, or in addition to, input from a 3D representation of the object. That is, either type of input may be used, or both types of input if they are available.

According to various embodiments, at 1616, sensor data from the physical object, a 3D representation of the object, and/or environmental context information is combined via a scene renderer to generate an environment-specific representation of the object. The environment-specific representation of the object may be used to procedurally generate an image dataset for the object, which may then be used to train a model to recognize the object in various contexts and positions. Additional details about such an approach are discussed with respect to the method 1700 shown in FIG. 17.

Figure 17:
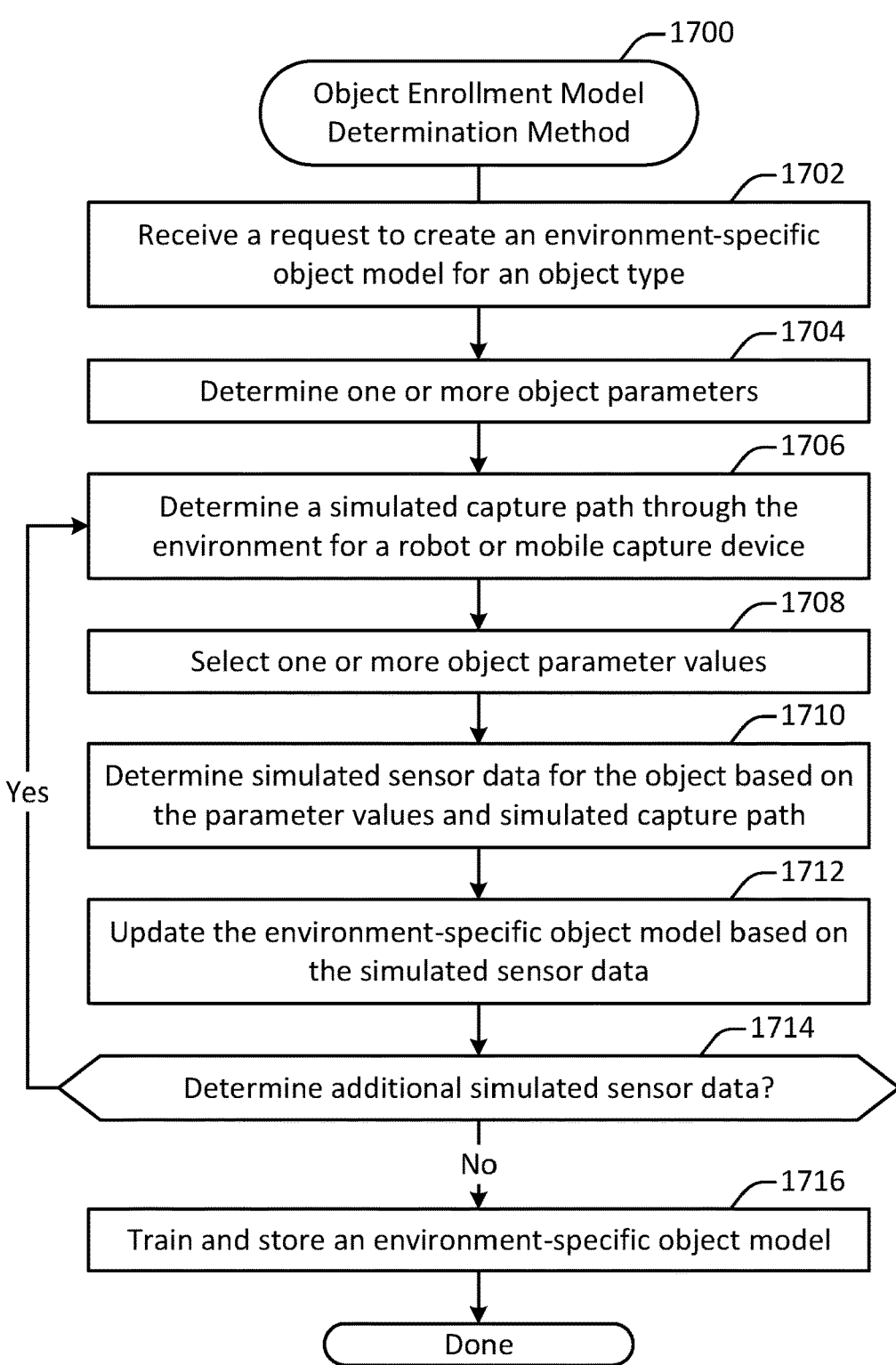
FIG. 17 illustrates a method for determining an object enrollment model, performed in accordance with one or more embodiments.

FIG. 17 illustrates a method 1700 for determining an object enrollment model, performed in accordance with one or more embodiments. According to various embodiments, the method 1700 may be performed on any suitable computing device or system.

A request to create an environment-specific object model for an object type is received at 1702. As discussed with respect to FIG. 15 and FIG. 16, the request may identify inputs such as sensor data of one or more physical instances of the object type, a three-dimensional model of the environment generated based on sensor input, and/or a three-dimensional model (e.g., a CAD model) of the object type.

One or more object parameters are determined at 1704. According to various embodiments, the object parameters may include intrinsic parameters, extrinsic parameters, placement parameters, and/or any other types of parameters. For example, intrinsic parameters may include aspects of the object itself that may vary depending on the particular instance of the object, such as size, shape, texture, shading, stacking, and blur. As another example, object placement parameters may include aspects of how the object is located within the environment, such as how the object is likely to be grouped, rotated, stacked vertically, and/or stacked horizontally. As yet another example, object extrinsic parameters may include aspects of the environment itself, such as light and shading under various conditions.

In some embodiments, object parameters may be determined automatically, for instance by analyzing images or models of the object and/or the environment. Alternatively, or additionally, object parameters may be determined based on user input.

A simulated capture path through the environment for a robot or mobile capture device is determined at 1706. According to various embodiments, the simulated capture path may take into account the characteristics of the robot or mobile capture device, such as the predicted height and location of the sensors of the mobile capture device as held by a human and/or the predicted height and location of the sensors of the robot as it travels along a path. The simulated capture path may be determined by analyzing information such as the environment navigation model.

According to various embodiments, various types of simulated capture paths may be determined and used to create simulated sensor data from a variety of perspectives. For instance, in a warehouse, simulated paths may be determined that involve moving both up and down each isle, from the perspective of both a robot and a human-held mobile capture device.

One or more object parameter values are selected at 1708. According to various embodiments, the object parameter values may include any or all of the extrinsic, intrinsic, and placement parameters. The object parameter values may be selected in various combinations, to ensure that images of the object in the environment are simulated using various possible appearances of the object. For example, the parameter values may be varied to ensure that images of the object are generated for various object positions, stacking configurations, lighting conditions, and/or angles. In addition, a combination may be used for more than one simulated path, to ensure that the object is viewed from different perspectives.

According to various embodiments, using the input data, the system may procedurally change the object parameters to generate simulated images of the object within the environment. In particular embodiments, the system may place the objects in areas of the 3D environment where it is most likely to occur, and/or place the object randomly within the 3D environment.

Simulated sensor data for the object is determined at 1710 based on the parameter values and the simulated capture path. According to various embodiments, determining the simulated sensor data may involve simulating the object within the environment model based on the parameter values selected at 1712. Then, simulated images or other sensor data of the simulated object may be generated based on the position of the sensors from various positions along the capture path determined at 1706.

In some embodiments, the operations shown in FIG. 17 may provide for the generation of a synchronized, multi-sensor, fully annotated contextual dataset that is procedurally generated. The simulated sensor data may include any or all of RGB image data, depth image data, point cloud data, and/or any other suitable data. The annotations may include, but are not limited to, object boundary segmentation, object bounding box, object orientation, and 3D object pose. The annotations may be determined based on, for instance, the object parameter values selected at 1708, the simulated capture path determined at 1706, and/or aspects of the environment navigation model.

A determination is made at 1714 as to whether to determine additional simulated sensor data. According to various embodiments, the system may continue to determine additional simulated sensor data until a terminating condition is met. In some implementations, the terminating condition may be the collection of a suitable amount of simulated sensor data. For instance, sensor data may be generated for all of a set of combinations of simulated capture paths and selected parameter values.

The environment-specific object model is trained at 1716 based on the simulated sensor data, and then stored on a storage device. According to various embodiments, training the environment-specific object model may involve providing the simulated sensor data to a suitable machine learning model, such as a convolutional neural network or other deep learning model.

According to various embodiments, the method shown in FIG. 17 may allow for the training of a machine learning model for recognizing the object in an automated fashion, without requiring the manual generation of the training images. At the same time, detector bias that would result from the use of a small and human-selected set of training images may be reduced or eliminated.

Any of the disclosed implementations may be embodied in various types of hardware, software, firmware, computer readable media, and combinations thereof. For example, some techniques disclosed herein may be implemented, at least in part, by non-transitory computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Java, Python, C++, C, HTML, any other markup language, JavaScript, ActiveX, VBScript, or Perl. Examples of non-transitory computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A non-transitory computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. For example, some techniques and mechanisms are described herein in the context of item transportation tasks. However, the techniques of the present invention apply to a wide variety of tasks. Particular embodiments may be implemented without some or all of the specific details described herein. In other instances, well known process operations have not been described in detail in order not to unnecessarily obscure the present invention. Accordingly, the breadth and scope of the present application should not be limited by any of the implementations described herein, but should be defined only in accordance with the claims and their equivalents.

The invention claimed is:

1. A method comprising:

determining one or more simulated capture paths for a virtual robot through a physical environment based on an environment navigation model of the physical environment determined based on sensor data collected via a handheld computing device, the environment navigation model including a plurality of semantic labels corresponding to elements of the physical environment;

receiving as input a three-dimensional model of an object type;

determining a plurality of simulated object parameter values for the object type, the simulated object parameter values identifying a plurality of possible variations of real-world conditions in which an object of the object type may appear, the simulated object parameter values including a parameter value selected from the group consisting of: object grouping, object rotation, and object stacking;

determining simulated sensor data for a plurality of simulated instances of the object type based on the one or more simulated capture paths, the environment navigation model, the three-dimensional model, and the simulated object parameter values, the simulated sensor data including image data collected from a simulated camera at the virtual robot;

training an environment-specific object recognition model based on the simulated sensor data, the environment-specific object recognition model being trained to recognize an object corresponding with the object type based on variations in appearance of objects corresponding to the object type that are specific to the physical environment;

transmitting the environment-specific object recognition model to a plurality of physical robots; and instructing the plurality of physical robots to autonomously navigate the physical environment and recognize objects based on the environment-specific object recognition model and sensor data collected via the plurality of physical robots.

2. The method recited in claim 1, wherein the simulated object parameter values include one or more object intrinsic characteristic parameters that characterize one or more physical characteristics of one or more of the plurality of simulated instances of the object type.

3. The method recited in claim 2, wherein the one or more object intrinsic characteristic parameters are selected from the group consisting of: size, shape, texture, shading, stacking, and blur.

4. The method recited in claim 1, wherein the simulated object parameter values include one or more object placement characteristic parameters that characterize one or more physical characteristics of one or more of the plurality of simulated instances of the object type.

5. The method recited in claim 1, wherein the simulated object parameter values include one or more object extrinsic characteristic parameters that characterize the physical environment.

6. The method recited in claim 5, wherein the one or more object extrinsic characteristic parameters include a parameter related to a lighting or shading condition of the physical environment.

7. The method recited in claim 1, wherein instructing the plurality of physical robots to autonomously navigate the physical environment comprises transmitting a navigation instruction from a fleet management system configured to manage operation of the plurality of physical robots at the physical environment.

8. The method recited in claim 1, wherein the handheld computing device is a mobile phone.

9. The method recited in claim 1, wherein the environment navigation model for the physical environment is determined based on simultaneous localization and mapping (SLAM).

10. The method recited in claim 1, wherein the simulated sensor data includes depth sensor data collected from a simulated depth sensor at the virtual robot.

11. The method recited in claim 1, wherein the simulated sensor data includes LIDAR data collected from a simulated LiDAR sensor at a robot.

12. One or more non-transitory computer readable media having instructions stored thereon for performing a method, the method comprising:

determining one or more simulated capture paths for a virtual robot through a physical environment based on an environment navigation model of the physical environment determined based on sensor data collected via a handheld computing device, the environment navigation model including a plurality of semantic labels corresponding to elements of the physical environment;

receiving as input a three-dimensional model of an object type;

determining a plurality of simulated object parameter values for the object type, the simulated object parameter values identifying a plurality of possible variations of real-world conditions in which an object of the object type may appear, the simulated object parameter values including a parameter value selected from the group consisting of: object grouping, object rotation, and object stacking;

determining simulated sensor data for a plurality of simulated instances of the object type based on the one or more simulated capture paths, the environment navigation model, the three-dimensional model, and the simulated object parameter values, the simulated sensor data including image data collected from a simulated camera at the virtual robot;

training an environment-specific object recognition model based on the simulated sensor data, the environment-specific object recognition model being trained to recognize an object corresponding with the object type based on variations in appearance of objects corresponding to the object type that are specific to the physical environment;

transmitting the environment-specific object recognition model to a plurality of physical robots; and instructing the plurality of physical robots to autonomously navigate the physical environment and recognize objects based on the environment-specific object recognition model and sensor data collected via the plurality of physical robots.

13. A system comprising a processor, a storage device, and memory, the memory including instructions to perform a method comprising:

determining one or more simulated capture paths for a virtual robot through a physical environment based on an environment navigation model of the physical environment determined based on sensor data collected via a handheld computing device, the environment navigation model including a plurality of semantic labels corresponding to elements of the physical environment;

receiving as input a three-dimensional model of an object type;

determining a plurality of simulated object parameter values for the object type, the simulated object parameter values identifying a plurality of possible variations of real-world conditions in which an object of the object type may appear, the simulated object parameter values including a parameter value selected from the group consisting of: object grouping, object rotation, and object stacking;

determining simulated sensor data for a plurality of simulated instances of the object type based on the one or more simulated capture paths, the environment navigation model, the three-dimensional model, and the simulated object parameter values, the simulated sensor data including image data collected from a simulated camera at the virtual robot;

training an environment-specific object recognition model based on the simulated sensor data, the environment-specific object recognition model being trained to recognize an object corresponding with the object type based on variations in appearance of objects corresponding to the object type that are specific to the physical environment;

transmitting the environment-specific object recognition model to a plurality of physical robots; and instructing the plurality of physical robots to autonomously navigate the physical environment and recognize objects based on the environment-specific object recognition model and sensor data collected via the plurality of physical robots.

* * * * *